United States Patent
Hall et al.

(10) Patent No.: US 9,864,048 B2
(45) Date of Patent: Jan. 9, 2018

(54) GATED TIME OF FLIGHT CAMERA

(71) Applicant: Microsoft Technology Licensing, LLC., Redmond, WA (US)

(72) Inventors: Michael Hall, Bellevue, WA (US); Algird Gudaitis, Fall City, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 240 days.

(21) Appl. No.: 14/714,295

(22) Filed: May 17, 2015

(65) Prior Publication Data

US 2016/0334508 A1    Nov. 17, 2016

(51) Int. Cl.
| | |
|---|---|
| G01S 7/486 | (2006.01) |
| G01S 17/10 | (2006.01) |
| G01S 17/36 | (2006.01) |
| G01S 7/491 | (2006.01) |
| G01S 17/89 | (2006.01) |
| G01S 7/481 | (2006.01) |

(52) U.S. Cl.
CPC ........... *G01S 7/4865* (2013.01); *G01S 7/4811* (2013.01); *G01S 7/4915* (2013.01); *G01S 17/10* (2013.01); *G01S 17/107* (2013.01); *G01S 17/36* (2013.01); *G01S 17/89* (2013.01); *G06T 2207/10028* (2013.01)

(58) Field of Classification Search
CPC .... G01S 7/4865; G01S 7/4866; G01S 7/4915; G01S 17/107; G01S 17/36; G06T 2207/10028
See application file for complete search history.

(56) References Cited

U.S. PATENT DOCUMENTS

| | | | | |
|---|---|---|---|---|
| 6,091,905 A | * | 7/2000 | Yahav | G01C 11/025 356/4.07 |
| 6,100,517 A | * | 8/2000 | Yahav | G01C 11/025 250/208.1 |
| 7,067,763 B2 | | 6/2006 | Schramm | |
| 7,224,384 B1 | * | 5/2007 | Iddan | G01S 7/4812 348/207.99 |
| 7,236,887 B2 | | 6/2007 | Wang et al. | |
| 7,719,662 B2 | | 5/2010 | Bamji et al. | |

(Continued)

FOREIGN PATENT DOCUMENTS

| | | |
|---|---|---|
| WO | 2008152647 A2 | 12/2008 |
| WO | 2014102442 A1 | 7/2014 |

OTHER PUBLICATIONS

Ouji, et al., "A Space-time Depth Super-resolution Scheme for 3D Face Scanning", In Proceedings of the 13th International Conference on Advanced Concepts for Intelligent Vision Systems, Aug. 22, 2011, 11 Pages.

(Continued)

*Primary Examiner* — John Villecco
(74) *Attorney, Agent, or Firm* — A. C. Entis-IP Ltd.

(57) ABSTRACT

A GT-TOF camera that illuminates a scene with a train of light pulses to determine amounts of light reflected from the transmitted light pulses by features in a scene for each of N different exposure periods and determines a distance to a feature in the scene responsive to a direction in an N-dimensional space of an N-dimensional vector defined by the amounts of reflected light determined for the feature for the N gates.

20 Claims, 9 Drawing Sheets

(56) References Cited

U.S. PATENT DOCUMENTS

| | | | | |
|---|---|---|---|---|
| 8,587,771 | B2* | 11/2013 | Xu | G01S 17/89 |
| | | | | 356/3.01 |
| 8,890,952 | B2* | 11/2014 | Katz | G01S 17/107 |
| | | | | 348/135 |
| 9,160,932 | B2* | 10/2015 | Felzenshtein | G01C 3/08 |
| 9,516,244 | B2* | 12/2016 | Borowski | G01S 7/486 |
| 9,538,109 | B2* | 1/2017 | Forster | G01S 7/497 |
| 9,578,311 | B2* | 2/2017 | Hall | H04N 5/2256 |
| 9,605,998 | B2* | 3/2017 | Nozawa | G01J 1/0407 |
| 2007/0091175 | A1* | 4/2007 | Iddan | G01S 7/4863 |
| | | | | 348/135 |
| 2012/0013887 | A1 | 1/2012 | Xu et al. | |
| 2013/0228691 | A1* | 9/2013 | Shah | H01L 27/14614 |
| | | | | 250/341.8 |
| 2015/0120241 | A1 | 4/2015 | Kadambi et al. | |
| 2015/0296200 | A1* | 10/2015 | Grauer | G01S 17/89 |
| | | | | 348/49 |
| 2016/0061655 | A1* | 3/2016 | Nozawa | G01S 17/10 |
| | | | | 250/578.1 |
| 2016/0223656 | A1* | 8/2016 | Hall | G01B 11/14 |
| 2017/0005124 | A1* | 1/2017 | Elkhatib | H01L 27/14607 |

OTHER PUBLICATIONS

Su, et al., "Fabrication of Digital Sinusoidal Gratings and Precisely Controlled Diffusive Flats and their Application to Highly Accurate Projected Fringe Profilometry", In Proceedings of Optical Engineering, vol. 42, Issue 6, Jun. 1, 2003, 5 Pages.

Kim, et al., "Design and Calibration of a Multi-view TOF Sensor Fusion System", In Proceedings of IEEE Conference on Computer Vision and Pattern Recognition, Jun. 23, 2008, 7 Pages.

Xu, et al., "Phase Error Compensation for Three-Dimensional Shape Measurement with Projector Defocusing", In Proceedings Applied Optics, vol. 50, No. 17, Jun. 10, 2011, pp. 2572-2581.

Zhang, Zhengyou, "A Flexible New Technique for Camera Calibration", In IEEE Transactions on Pattern Analysis and Machine Intelligence, Dec. 2, 1998, 22 Pages.

Peppa, Maria Valasia, "Precision Analysis of 3D Camera", In Master of Science Thesis, Sep. 2013, 166 Pages.

McClure, et al., "Resolving Depth-Measurement Ambiguity with Commercially Available Range Imaging Cameras", In Image Processing, Machine Vision Applications III, 5 Pages.

"International Search Report and Written Opinion Issued in PCT Application No. PCT/US2016/028003", dated Jul. 20, 2016, 14 Pages.

Bhandari, et al., "Resolving Multipath Interference in Time-of-Flight Imaging via Modulation Frequency Diversity and Sparse Regularization", In Journal of Optics Letters, vol. 39, Issue 6, Mar. 15, 2014, pp. 1705-1708.

Jimenez, et al., "Modeling and Correction of Multipath Interference in Time of Flight Cameras", In Journal of Image and Vision Computing, vol. 32, Issue 1, Nov. 14, 2013, 13 Pages.

Kirmani, et al., "SPUMIC: Simultaneous Phase Unwrapping and Multipath Interference Cancellation in Time-of-Flight Cameras Using Spectral Methods", In Proceedings of IEEE International Conference on Multimedia and Expo, Jul. 15, 2013, 6 Pages.

"Second Written Opinion Issued in PCT Application No. PCT/US2016/028003", dated Apr. 13, 2017, 8 Pages.

"International Preliminary Report on Patentability, PCT Application No. PCT/US2016/028003", dated Aug. 3, 2017, 16 Pages.

* cited by examiner

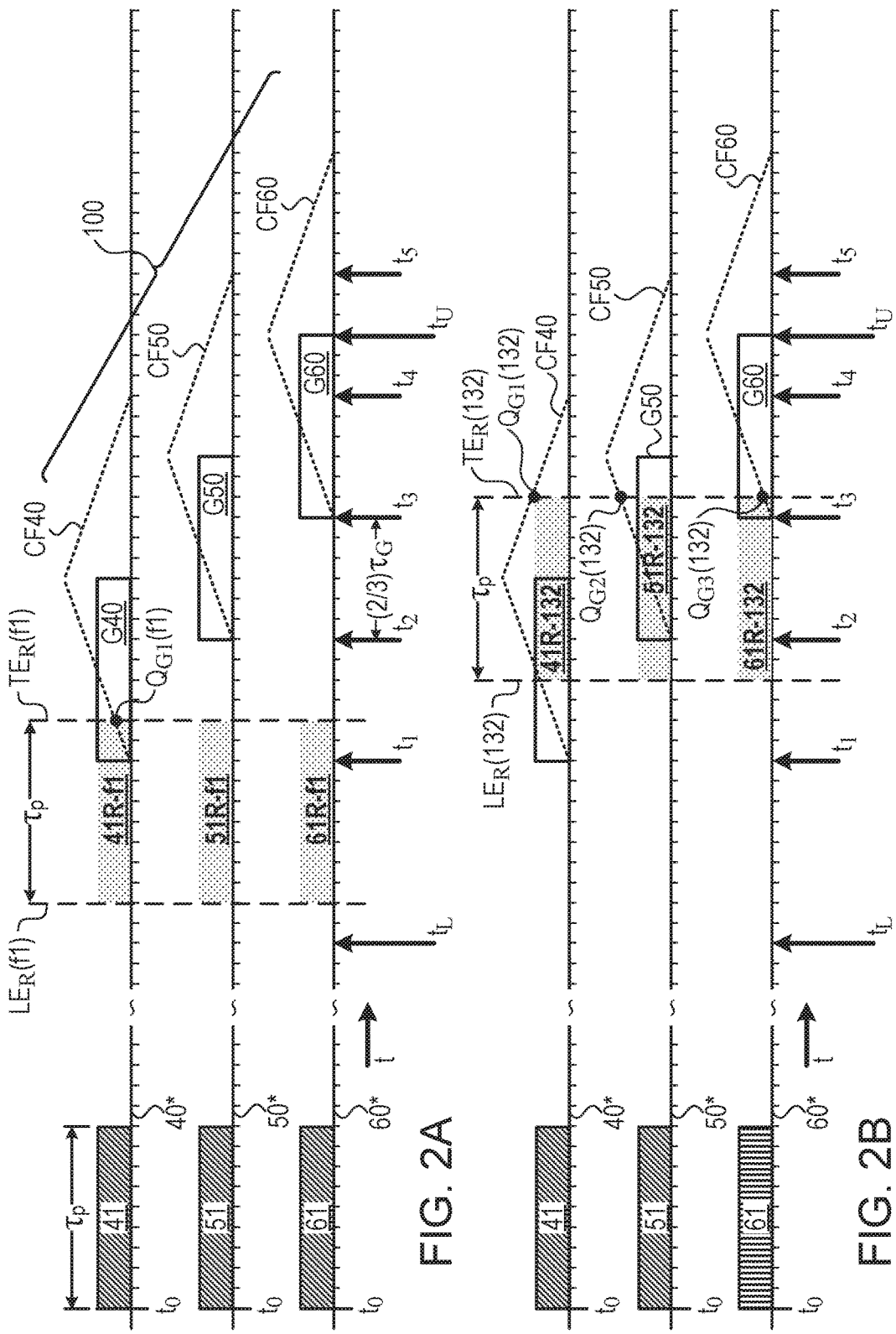

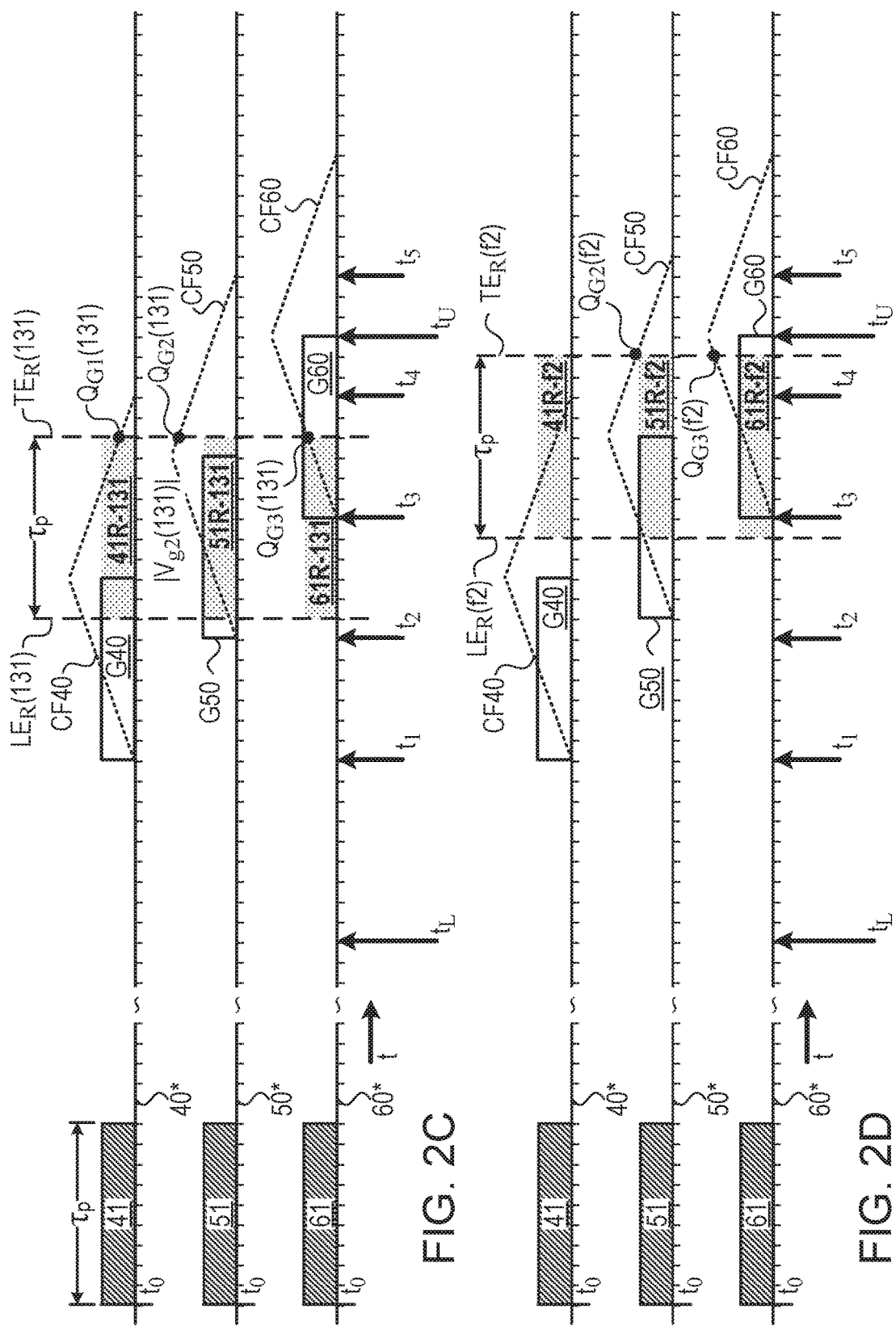

GATED TIME OF FLIGHT CAMERA

BACKGROUND

A gated time of flight (GT-TOF) range camera determines distances to features in a scene that it images by illuminating the scene typically with a train of light pulses. After a substantially same time delay following transmission of each light pulse in the light pulse train, the GT-TOF camera gates ON for a short exposure period during which pixels in a photosensor of the camera are sensitive to, and register light incident on the pixels. During the short exposure period following a light pulse, a pixel imaging light from a given feature in the scene registers an amount of light that the given feature reflects from the light pulse back to the camera. The camera uses a sum of the amounts of reflected light that the pixel registers for the given feature during the exposure periods for all the light pulses in the light pulse train to determine a round trip time, $t_R$, for light to travel from the camera to the given feature and back to the camera. The round trip time $t_R$ for the feature and the speed of light are used to determine a distance to the feature.

SUMMARY

An aspect of an embodiment of the disclosure relates to providing a GT-TOF camera for determining distances to features in a scene responsive to light that the camera registers during each of a plurality of, "N", different "gates". For each of the N different gates, the camera is gated ON for a short exposure period following each light pulse of optionally a plurality of light pulses that the GT-TOF camera transmits to illuminate the scene, to register light reflected from the light pulse back to the camera by the features. A gate is a state of the GT-TOF camera defined by a time $t_{on}$ at which an exposure period of the gate is initiated relative to a time at which an associated light pulse that it follows is transmitted, and a time dependence of the exposure period relative to $t_{on}$. Two gates are different if their respective exposure periods are initiated by the GT-TOF camera at different times $t_{on}$ following a transmitted light pulse and/or if the exposure periods have different time dependences relative to $t_{on}$ once initiated. The camera processes amounts of reflected light from a feature in the scene that the camera registers for each of the N different gates to define a phase of a gating cycle of the N gates during which light reflected by the feature from the transmitted light pulses was registered. The phase is a function of both the round trip time $t_R$ for the feature and the time dependencies of the gates, and the camera uses the phase, hereinafter also referred to as a "range phase", or "range phase angle", to determine the distance or "range" to the feature and therefrom a range image of the scene.

In an embodiment of the disclosure, an amount of reflected light from a feature that the camera registers during each different gate of the N gates may be treated as a component of a "gate vector" along a different axis of N axes that span an N-dimensional, "gating" space. The camera may determine a vector, hereinafter also referred to as a "range phasor", in a two dimensional space responsive to projections of the N gate vector components onto a plane of the two dimensional space. The range phase angle is determined as an angle that the range phasor makes with an axis of the two dimensional space.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

FIGS. 2A-2D show schematic time line graphs illustrating temporal relationships between light pulses transmitted by the camera to illuminate the scene shown in FIG. 1, gates of an optionally three dimensional (3D) gating space, and light pulses reflected by features in the scene, in accordance with an embodiment of the disclosure;

DETAILED DESCRIPTION

Figure 1:
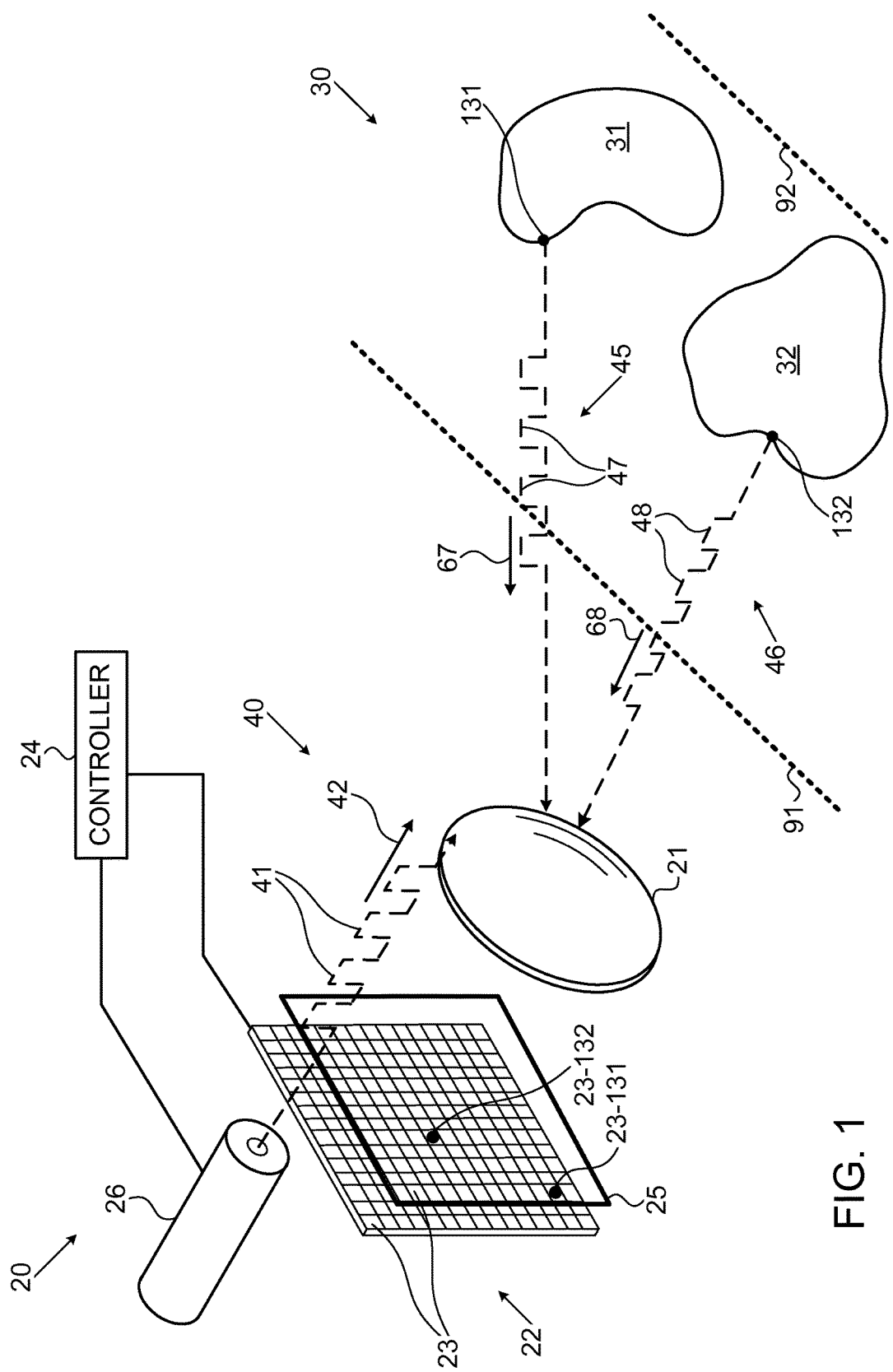
FIG. 1 schematically shows a GT-TOF camera transmitting a train of light pulses to illuminate a scene and determine range phases and distances to feature in the scene, in accordance with an embodiment of the disclosure.

In the description below features of a GT-TOF camera that operates in accordance with an embodiment of the disclosure to determine gate vectors and range phase angles for features in a scene, and thereby distances to the features and a range image for the scene are discussed with reference to FIG. 1. FIG. 1 schematically shows the GT-TOF camera transmitting a train of light pulses to illuminate the scene and light pulses reflected from the transmitted light pulses back to the camera by two features in the scene. The figure schematically indicates a distance range for which the GT-TOF camera is able to provide distances to features in the scene. The range is determined substantially by temporal relationships between light pulses that the camera transmits and gates during which the camera is gated ON to register light. The gates and temporal relationships are not shown in FIG. 1 but are shown in and discussed with reference to FIGS. 2A-2D.

FIGS. 2A-2D show schematic time-line graphs that illustrate temporal relationships between light pulses that the GT-TOF camera transmits to illuminate the scene and different gates of N gates during which the camera registers light reflected from the transmitted light pulses back to the camera by selected features in the scene. Optionally, the GT-TOF camera operates using N=3 different gates, and each FIG. 2A-2D shows three time-lines, one for each gate. Each time-line in a same FIG. 2A-2D illustrates temporal relationships for a different one of the three gates, a light pulse that the GT-TOF camera transmits to illuminate the scene, and a light pulse reflected from the transmitted light pulse back to the camera by a same selected feature in the scene. Each of FIGS. 2A-2D shows the temporal relationships for a different selected feature.

Each time-line in a FIG. 2A-2D shows a schematic idealized rectangular representation of a single light pulse, optionally comprised in a train of light pulses that the camera transmits to illuminate the scene. The single transmitted light pulse shown along a given time-line in a same FIG. 2A-2D is optionally different from the single transmitted light pulse shown along a time-line in the FIG. 2A-2D different from the given time-line. The transmitted light pulse shown along a time-line is indicated as having been transmitted at a nominal transmission time, $t_o$, which transmission time serves as an "origin of time", for the time-line relative to which, time along the time-line may conveniently be referenced. Nominal time $t_o$ for different time-lines have no necessary logical or temporal connection, have no necessary logical or temporal connection to any particular "real" time, and generally reference different real times. However, were the schematic representations of transmitted light pulses along different time lines considered to be representations of a possible same transmitted light pulse, in accordance with an embodiment, then of course $t_o$ would represent a same real time.

The transmitted light pulse along each time-line is followed by a schematic idealized rectangular representation of a different gate of the optionally N=3 different gates for which the GT-TOF camera may be gated ON following time $t_o$ at which the GT-TOF camera transmits a light pulse to illuminate the scene. As noted above, a gate is a state of the GT-TOF camera defined by a time $t_{on}$ at which the camera gates ON for an exposure period following a time $t_o$ at which the camera transmits a light pulse, and a time dependence of the exposure period relative to $t_{on}$. Two gates are different if their respective ON times $t_{on}$ (relative to a light pulse transmission time $t_o$) are different, and/or if their respective exposure periods have different time dependences relative to $t_{on}$. A gate may comprise one or more exposure periods following transmission of a same light pulse in a train of light pulses and prior to transmission of a next light pulse in the train of light pulses. The gates shown in FIGS. 2A-2D are single exposure period gates. Gates having more than one exposure period are discussed with reference to FIGS. 6 and 7.

Each time-line in a same given figure FIG. 2A-2D also shows a representation of a reflected light pulse that is reflected from the transmitted light pulse shown along the time-line by the selected feature in the scene to which the given figure relates. A time correlation between the gate and the reflected light pulse shown along the time-line is schematically represented by an amount by which the representations of the reflected light pulse and the gate overlap. An amount of light from the reflected light pulse that the GT-TOF camera registers for the selected feature during the gate is a function of the overlap and corresponding time correlation. The amounts of light registered for the feature during the three, N=3, different gates define three different components of a 3D gate vector for the feature from which a range phasor, range phase angle, and distance to the feature may be determined, in accordance with an embodiment of the disclosure.

Figure 3A:
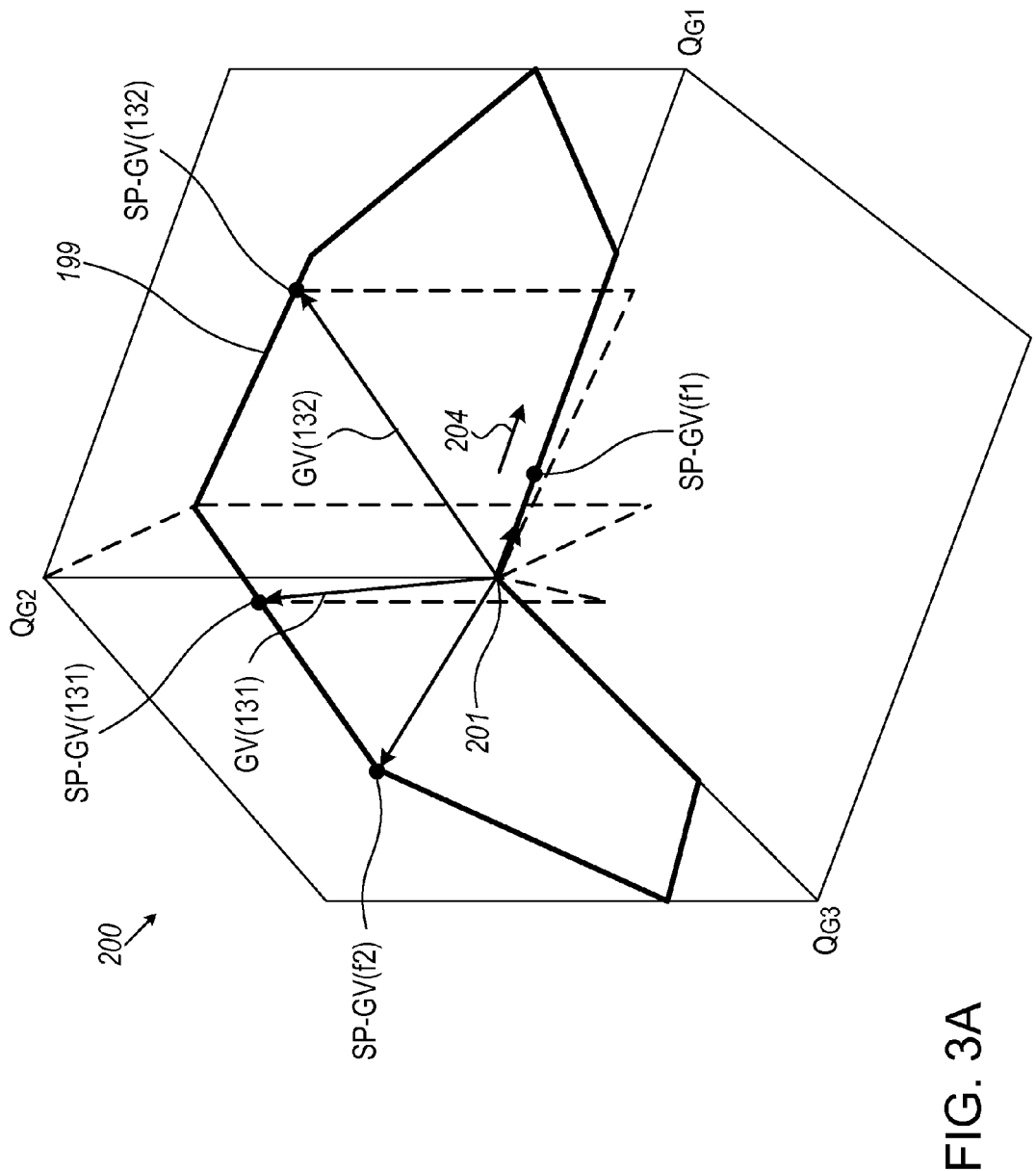
FIG. 3A schematically shows a 3D "gating space curve" traced out by a gate vector of the 3D gating space as a function of distance to a feature in the scene that generates the gate vector for the gates and light pulses having the temporal relationships shown in FIGS. 2A-2D and the idealized rectangular shapes by which they are represented in FIGS. 2A-2D, in accordance with an embodiment of the disclosure.
Figure 3B:
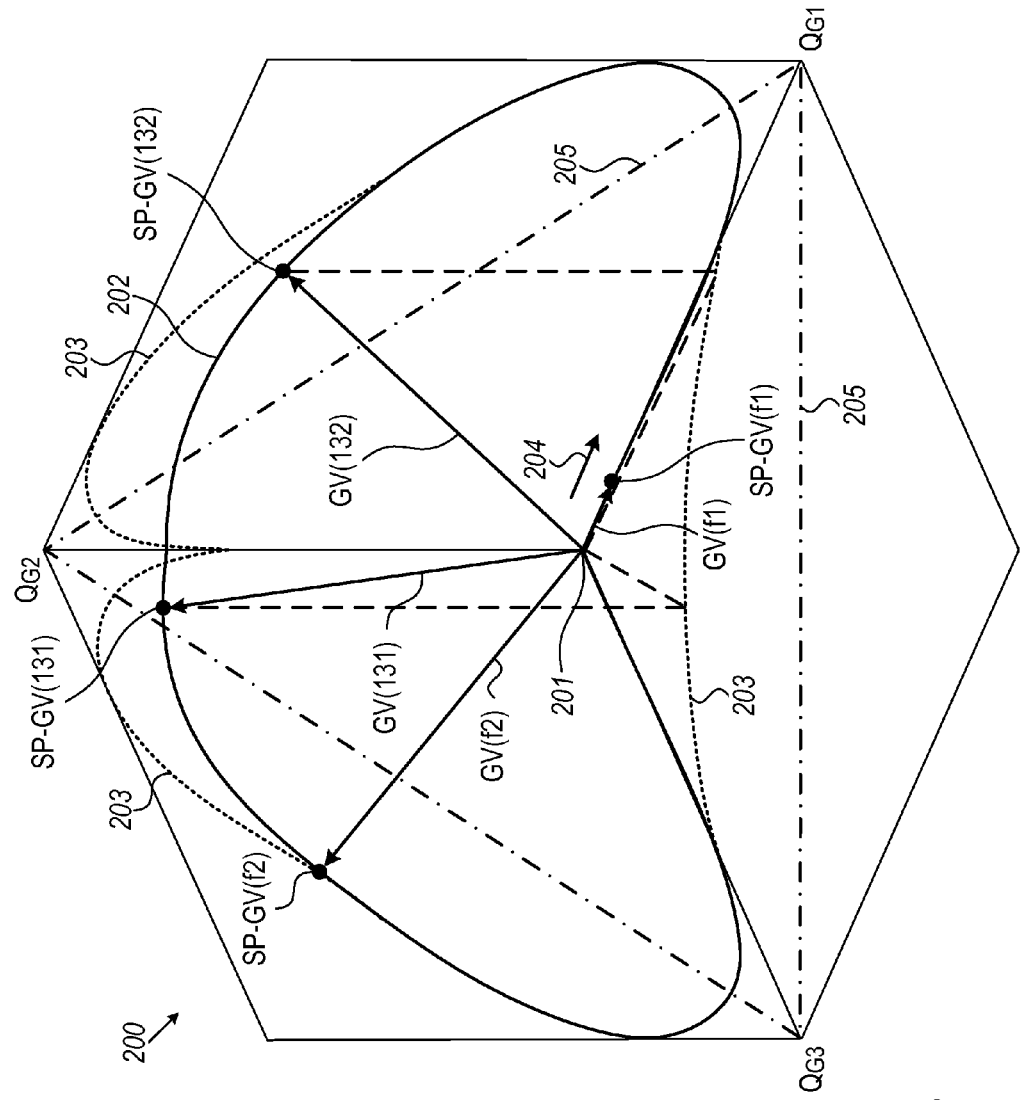
FIG. 3B schematically shows a 3D gating space curve determined for gates and light pulses having temporal relationships shown in FIGS. 2A-2D and simulated realistic shapes, in accordance with an embodiment of the invention.

FIG. 3A shows a schematic 3D gating space curve that an end of a gate vector defined by amounts of reflected light from a feature in the scene that the camera registers for each of the three gates traces out as a distance of the feature from the GT-TOF camera changes. Ends of gate vectors defined by amounts of light registered by the GT-TOF camera for the different selected features for which timing relationships are shown in FIGS. 2A-2D are indicated on the gating space curve by solid circles. The gating space curve in FIG. 3A is determined assuming that the light pulses and gates shown in FIGS. 2A-2D have the idealized rectangular shapes by which they are represented in the figures. FIG. 3B shows a gating space curve determined using simulated realistic shapes for the light pulses and gates shown in FIGS. 2A-2D.

Figure 4:
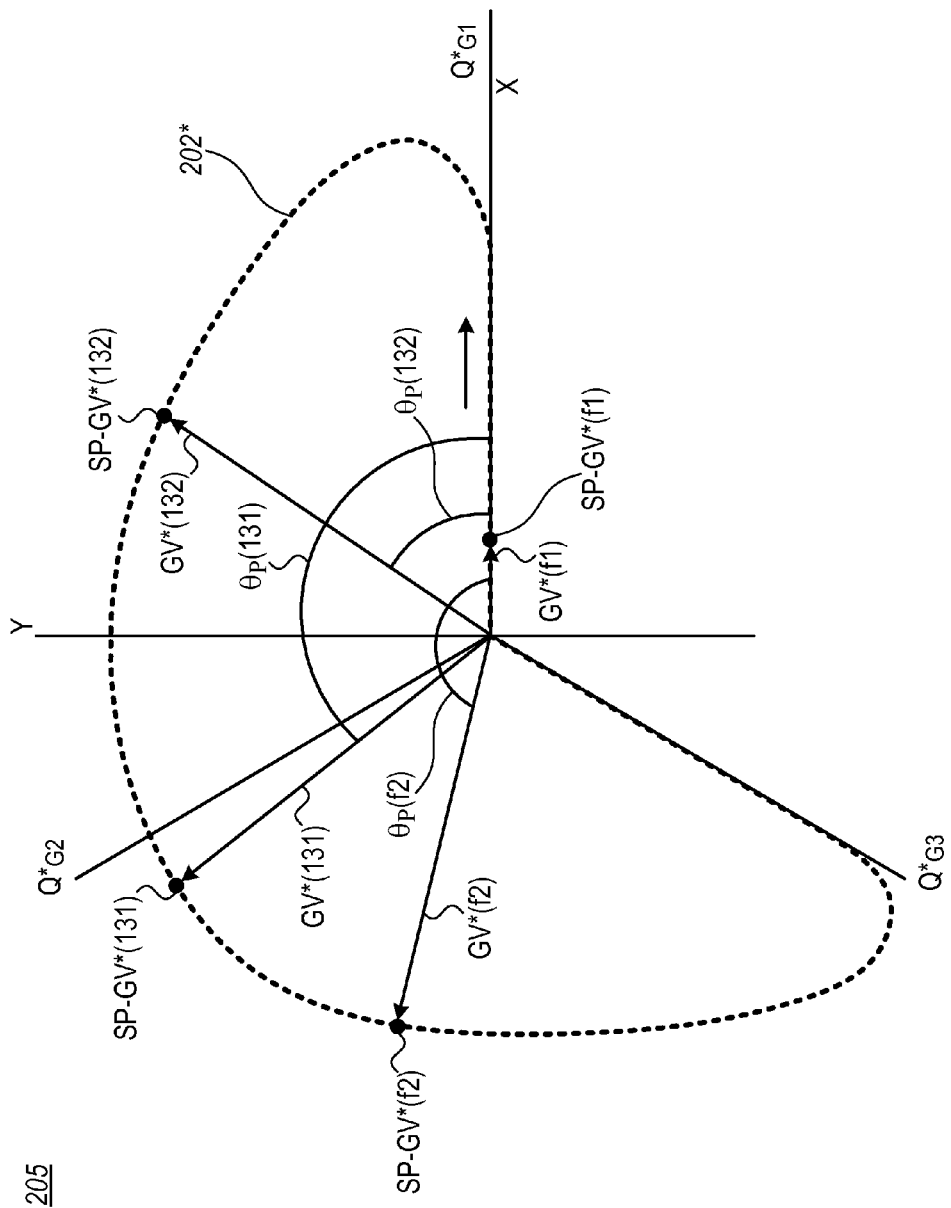
FIG. 4 shows a projection of the 3D gating space curve shown in FIG. 3 onto a plane to provide a two dimensional (2D) "phase trajectory" that a range phasor defined by a gate vector traces out as distance from the GT-TOF camera of a feature associated with the gate vector changes, in accordance with an embodiment of the disclosure.
Figure 5:
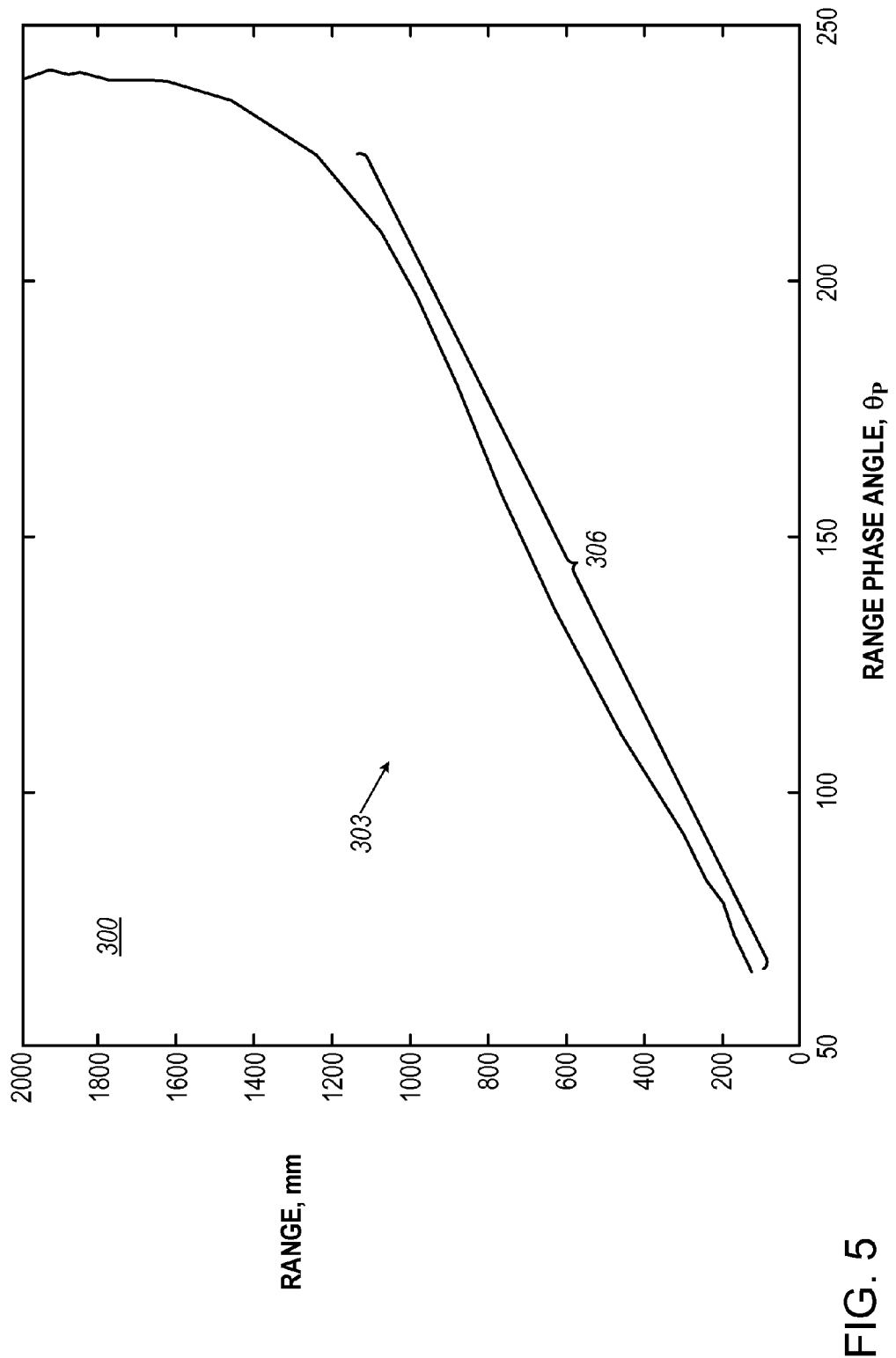
FIG. 5 shows a graph of distance of a feature in the scene from the GT-TOF camera as a function of range phase determined for the feature by the features range phasor, in accordance with an embodiment of the disclosure.

FIG. 4 shows a projection of the 3D gating space curve shown in FIG. 3B onto a plane of a two dimensional (2D) space. The projection provides a 2D curve, hereinafter also referred to as a "phasor trajectory". The phasor trajectory illustrates how a range phasor and its associated range phase angle in accordance with an embodiment of the disclosure may be defined and change with distance from the GT-TOF camera of a feature associated with the range phasor. The figure shows range phasors and range phase angles for features for which temporal relationships are shown in FIGS. 2A-2D and gate vectors are shown in FIG. 3B. FIG. 5 shows a graph of distance of a feature in the scene from the GT-TOF camera as a function of range phase angle determined for the feature assuming the phasor trajectory shown in FIG. 4.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Unless otherwise indicated explicitly or by context, the word "or" in the description and claims is considered to be the inclusive "or" rather than the exclusive or, and indicates at least one of, or any combination of items it conjoins.

FIG. 1 schematically shows a GT-TOF camera 20 operating to determine distances to features in a scene 30 having objects 31 and 32, in accordance with an embodiment of the disclosure. GT-TOF camera 20, which is shown very schematically, comprises an optical system represented by a lens 21, and a photosensor 22 having pixels 23 on which the lens system images scene 30. GT-TOF camera 20 optionally comprises a shutter 25 for shuttering or gating the camera ON and OFF, a light source 26, and a controller 24 that controls shutter 25 and light source 26. Whereas GT-TOF camera 20 is schematically shown having a shutter 25 separate from photosensor 22, a GT-TOF camera may comprise a photosensor that includes circuitry operable to gate ON and gate OFF the photosensor and thereby the camera. A reference to shuttering or gating ON, or shuttering or gating OFF a GT-TOF camera or photosensor, is understood to include shuttering, gating, or turning ON and OFF respectively the camera, the photosensor or a pixel or pixels in the photosensor, using any methods or devices known in the art, irrespective of whether or not specific reference is made to a "separate" shutter.

To determine distances to features in scene 30, controller 24 controls GT-TOF camera 20 to transmit at least one pulse train of light pulses to illuminate the scene and to gate ON and gate OFF photosensor 22 following each of a plurality of light pulses in each of the at least one light pulse train. Controller 24 gates ON and gates OFF photosensor 22, in accordance with a gating configuration that defines gate vectors for determining range phase angles for the features, in accordance with an embodiment of the disclosure.

In an embodiment, the at least one pulse train comprises a plurality of light pulse trains, and by way of example, controller 24 is assumed to control light source 26 to transmit a plurality of optionally three light pulse trains to illuminate scene 30 and determine distances to features in the scene. At a time following a predetermined delay after each of a plurality of light pulses in a given pulse train of the plurality of pulse trains is transmitted, controller 24 controls shutter 25 to gate ON photosensor 22 for a gate associated with the given pulse train. During the gate, pixels 23 in photosensor 22 register light reflected from the transmitted light pulse by features in scene 30 that are respectively incident on photosensor 22 and imaged on the pixels during the gate. An amount of light registered by a pixel 23 on which a feature of scene 30 is imaged is a function of and provides a measure of a correlation in time of the reflected light pulse and the gate. The time correlation is a function of a round trip time, $t_R$, for light to travel from GT-TOF camera 20 to the feature and back to the camera.

A pixel in a camera photosensor, such as a pixel 23 in photosensor 22, registers an amount of incident light by accumulating positive or negative electric charge, also referred to as "photocharge", provided by electron-hole pairs generated by photons in the incident light. Circuitry in the TOF camera converts photocharge accumulated by the pixels into voltages that are used as measures of the amounts of photocharge they respectively accumulate. A set of voltages representing the accumulated photocharges and corresponding amounts of light registered by the pixels may be referred to as a "frame" of the photosensor. Acquiring a frame of a photosensor may be referred to as "reading" the photosensor, reading the pixels, or reading the photocharge in the pixels. An amount of light that a pixel registers may refer to an amount of optical energy incident on the pixel, an amount of photocharge accumulated by a pixel responsive to incident light, or to any representation of the accumulated photocharge, such as by way of example a voltage, current, or digital data generated responsive to the accumulated photocharge.

In FIG. 1, by way of example, GT-TOF camera 20 is schematically shown transmitting a pulse train 40 of the plurality of the optionally three transmitted pulse trains that GT-TOF camera 20 transmits to illuminate scene 30. Pulse train 40 comprises transmitted light pulses 41, schematically represented by rectangular pulses associated with an overhead arrow 42 indicating direction of propagation of the light pulses. In practice, light pulses 41 are generally not rectangular, may have irregular pulse shapes, and may have rising and falling edges that resemble curves that describe a capacitor charging and discharging respectively. Light pulses 41 optionally have pulse widths between about 1 ns and about 20 ns (nanoseconds).

Features in scene 30 reflect light from each transmitted light pulse 41 back towards GT-TOF camera 20 as reflected light pulses. In FIG. 1, objects 31 and 32 have features 131 and 132 respectively that are schematically shown reflecting light from transmitted light pulses 41 as trains 45 and 46 of reflected light pulses 47 and 48 respectively. Overhead arrows 67 and 68 schematically indicate direction of propagation of light pulses 47 and 48, respectively. Each reflected light pulse, 47 and 48, has reduced intensity compared to the transmitted light pulse 41 from which it was reflected but substantially a same pulse shape as the transmitted light pulse. Intensities of reflected light pulses 47 and 48 are dependent, in addition to other factors such as respective distances of features 131 and 132 from GT-TOF camera 20, on reflectivity of the features for light transmitted by light source 26.

Light in reflected light pulses 48 from feature 132 is imaged on a pixel 23-132 in photosensor 22. If the light in a reflected light pulse 48 reaches pixel 23-132 during the gate that follows the transmitted light pulse from which light in the reflected light pulse is reflected by feature 23, the pixel registers the light. An amount of the light that pixel 23-132 registers is proportional to a time correlation of reflected light pulse 48 and the gate, which as noted above is a function of a round trip time $t_R$ of light from light source 26 to feature 23 and back to camera 20. If all the light in reflected light pulse 48 reaches GT-TOF camera 20 before or after the gate, pixel 23-132 does not register light from the reflected light pulse. Similarly, light from feature 131, which is schematically shown farther from GT-TOF camera 20 than feature 132, is imaged on a pixel 23-131. An amount of light from a reflected light pulse 47 reflected by feature 131 that is registered by pixel 23-131 is proportional to a time correlation of the reflected light pulse with the gate following the transmitted light pulse 41 from which light in the reflected light pulse 47 is reflected by feature 131. Pixel 23-131 does not register light from reflected light pulse 47 if the light reaches the camera before or after the gate.

If no light reflected by a feature in scene 30 from the plurality of light pulse trains transmitted by GT-TOF camera 20 to illuminate scene 30 is registered by a pixel 23 on which the feature is imaged, the feature is located at a distance from GT-TOF camera 20 that is outside a maximum depth range, "DR-M", of the camera. For a feature outside of the maximum depth range DR-M of GT-TOF camera 20, the camera does not provide time of flight information useable to determine a distance from the camera at which the feature may be located, except possibly to provide information that the feature is out of range of the camera. Lower and upper bound distances that delimit the maximum depth range DR-M of GT-TOF camera 20 are schematically indicated by dashed lines 91 and 92.

By way of example, GT-TOF camera 20 is assumed to be imaging scene 30 using a gating configuration 100 configured to determine 3D gate vectors for features in scene 30, in accordance with an embodiment of the disclosure schematically illustrated in FIG. 2A and FIGS. 2C-2D. Gating configuration 100, as noted above, optionally comprises a plurality of three light pulse trains, including light pulse train 40 shown in FIG. 1, and two light pulse trains referred to as pulse trains 50, and 60 (not shown). Features of gating configuration 100 are shown in FIG. 2A and FIGS. 2B-2D that follow along times lines 40*, 50*, and 60* associated with pulse trains 40, 50, and 60 respectively. Gates associated with each light pulse train 40, 50, and 60, are shown along time lines 40*, 50*, and 60* respectively, relative to a transmission time $t_o$ at which a light pulse in the train is transmitted by light source 26. Representative transmitted light pulses in trains 40, 50, and 60 are represented by shaded rectangles 41, 51, and 61, and are shown with their respective leading edges at times represented by a time $t_o$ at which they are transmitted by light source 26. Light pulses 41, 51, and 61 in pulse trains 40, 50 and 60 respectively optionally have a substantially same pulse width $t_p$ and are associated with gates G40, G50, and G60 respectively having exposure periods represented by rectangles along time lines, 40*, 50*, and 60* respectively. GT-TOF camera 20 is gated ON following transmission times $t_o$ of light pulses 41, 51, and 61 at ON times $t_1$, $t_2$, and $t_3$ respectively for exposure periods of gates G40, G50, and G60. The exposure periods of the gates, which may also be referred to as their respective gate widths "$\tau_G$", optionally have a substantially same duration, and are optionally substantially equal to pulse width $\tau_p$), as schematically shown for the example in FIGS. 2A-2D. In an embodiment, $t_1 < t_2 < t_3$ and consecutive ON times differ by substantially (⅔)$\tau_G$, which is equal to (⅔)$\tau_p$ for the example case schematically shown in FIGS. 2A-2D.

FIG. 2A shows reflected light pulses represented by shaded rectangles 41R-f1, 51R-f1, and 61R-f1 that are reflected by a feature "f1" (not shown) in scene 30 from transmitted light pulses 41, 51, and 61 respectively. The light pulses have leading edges indicated by a dashed line $L_{ER}$(f1) and trailing edges represented by a dashed line $T_{ER}$(f1). An amount by which a reflected light pulse 41R-f1, 51R-f1, and 61R-f1, overlaps a gate G40, G50, or G60 respectively represents a time correlation of the reflected light pulse with the gate. Schematic correlation functions CF40, CF50 and CF60 for gates G40, G50, and G60 respectively are represented by dotted lines and indicate values for time correlations between the gates and a reflected light pulse as a function of a time at which a trailing edge of the light pulse reaches GT-TOF camera 20. For example, an intersection of trailing edge $T_{ER}$(f1) of a reflected light pulse 41R-f1, 51R-f1, or 61R-f1 with a correlation function CF40, C50, or C60 respectively indicates a value for the time correlation function between the reflected light pulse and gate G40, G50, or G60 respectively. An amount of light in reflected light pulse 41R-f1, 51R-f1, or 61R-f1 which a pixel 23 in photosensor 22 that images feature f1 registers, or an amount of photocharge that the pixel accumulates in response to the reflected light pulse, is a function of the time correlation function. Reflected light pulses having a leading edge that reaches GT-TOF camera 20 earlier than a time $_{tL}$ or later than a time $_{tU}$ shown in FIG. 2A do not overlap any of gates G40, G50, or G60 and are out of range of GT-TOF camera 20 when imaging scene 30 using gating configuration 100. Time $_{tL}$ is an earliest time of arrival at GT-TOF camera 20 of a leading edge of transmitted light pulse 41 for which the camera can register light from the light pulse. Time $_{tU}$ is a latest time of arrival at GT-TOF camera 20 of a leading edge of transmitted light pulse 61 for which the camera can register light from the light pulse. Times $_{tL}$ and $_{tU}$ correspond to lower and upper bound distances 91 and 92 shown in FIG. 1 that delimit the maximum depth range DR-M of GT-TOF camera 20.

Feature f1, is assumed to be located near to lower bound 91 (FIG. 1), just inside of depth range DR-M, and reflected light pulses 41R-f1, 51R-f1, or 61R-f1 have leading edges indicated by $LE_R$(f1) in FIG. 2A that reach GT-TOF camera 20 slightly later than time $t_L$. As a result, whereas reflected gate G40 is partially overlapped by reflected light pulse 41R-f1 gates G50 and G60 are not overlapped by reflected light pulses from feature f1. A pixel 23 (FIG. 1) in GT-TOF camera 20 that images feature f1 therefore registers light and accumulates photocharge for feature f1 only for gate G40.

Let $Q_{G1}$ represent a variable that assumes a value equal to or representative of an amount of photocharge that a pixel 23 that images a feature in scene 30 accumulates responsive to light in a reflected light pulse from the feature that is incident on the camera during gate G40. Assume further that $Q_{G1}$ is normalized to a maximum amount of light $Q_o$, also referred to as a normalizing photocharge, that the pixel might accumulate if a leading edge of the reflected light pulse is coincident with ON time $t_1$ of gate G40 and the light pulse is therefore coincident with the gate. $Q_{G1}$ may therefore assume a value between 0 and 1 inclusive. Similarly, let $Q_{G2}$ and $Q_{G3}$ in FIG. 2B be variables that assume values in the range 0 to 1 inclusive that represent amounts of normalized photocharge accumulated by a pixel 23 in photosensor 22 GT-TOF camera 20 responsive to reflected light pulses from a feature imaged on the pixel during gates G50 and G60 respectively. The values for $Q_{G1}$, $Q_{G2}$, and $Q_{G3}$, hereinafter also referred to as normalized photocharges, for a feature in scene 30 imaged by GT-TOF camera 20 define three components of a 3D gate vector for the feature in accordance with an embodiment of the disclosure. Assuming, by way of example, that correlation functions CF40, CF50 and CF60 are normalized to a maximum value of 1, FIG. 2A indicates by way of example, that for feature f1, $Q_{G1}=Q_{G1}$(f1)≈0.22 and $Q_{G2}$ and $Q_{G3}$=0. Feature f1 may therefore have a "normalized" gate vector, GV(f1)=(0.22, 0, 0), in accordance with an embodiment of the disclosure.

FIG. 2B schematically shows time lines 40*, 50*, and 60* for transmitted light pulses 41, 51, and 61, gates G40, G50, and G60, and light reflected from transmitted light pulses 41, 51, and 61 by feature 132 (FIG. 1) back to GT-TOF camera 20 in reflected light pulses 41R-132, 51R-132, and 61R-132 that are imaged on pixel 23-132 (FIG. 1). Feature 132 is farther from GT-TOF camera 20 than feature f1 and leading edges of reflected light pulses 41R-132, 41R-132, and 41R-132 indicated by a dashed line $L_{ER}$(132) arrive at GT-TOF camera 20 at a time between times $_{t2}$ and $_{t3}$ so that light pulses 41R-132, 41R-132, and 41R-132 partially overlap gates G40, G50 and G60. FIG. 2B indicates that for feature 132 by way of example, $_{QG1}=_{QG1}$(132)≈0.55, $_{QG2}=_{QG2}$(132)≈0.77, and $_{QG3}=_{QG3}$(132)≈0.11. Feature 132 may therefore have a normalized gate vector GV(132)=(0.55,0.77,0.11), in accordance with an embodiment of the disclosure.

FIG. 2C similarly indicates that for feature 131 (FIG. 1), by way of example, normalized photocharge $Q_{G1}=Q_{G1}$(131)≈ 0.33, normalized photocharge $Q_{G2}=Q_{G2}$(131)≈0.88, and normalized photocharge $Q_{G3}=Q_{G3}$(131)≈0.44. Feature 131 may therefore have a normalized gate vector GV(132)= (0.33,0.88,0.44), in accordance with an embodiment of the disclosure.

FIG. 2D schematically shows time lines 40*, 50*, and 60* for transmitted light pulses 41, 51, and 61, gates G40, G50, and G60, and light reflected from the transmitted light pulses by a feature f2 back to GT-TOF camera 20 in reflected light pulses 41R-f2, 51R-f2, and 61R-f2. Feature 132 is farther from GT-TOF camera 20 than feature 131 and is assumed by way of example, located relatively close to upper bound distance 92 (FIG. 1) of the maximum depth range of GT-TOF camera 20. As a result, whereas reflected light pulses 51R-f2, and 61R-f2 partially overlap gates G50 and G60 respectively, reflected light pulse 41R-f2 GT-TOF does not overlap gate G40. FIG. 2D indicates that for feature 131 (FIG. 1), by way of example, $Q_{G1}=Q_{G1}(f2)\approx0$, $Q_{G2}=Q_{G2}(f2)\approx0.55$, and $Q_{G3}=Q_{G3}(f2)\approx0.88$ and that feature f2 may therefore have a normalized gate vector GV(f2)=(0,0.55, 0.88), in accordance with an embodiment of the disclosure.

It is noted that in FIGS. 2A-2D correlation functions CF40, CF50, and CF60, are rectilinear, triangular functions because they represent correlation functions assuming that gates G40, G50, and G60, transmitted light pulses 41, 51, and 61, and light pulses reflected from the transmitted light pulses are represented by idealized, rectangular functions. Idealized rectangular representations of light pulses and gates, and rectilinear triangular correlation functions CF40, CF50, and CF60 are useful in visually representing and understanding features of a gating configuration in accordance with an embodiment of the disclosure. However whereas light pulses, gates, and correlation functions may usefully be approximated by idealized shapes, in practice, light pulses, gates, and correlation functions of a gating configuration, in accordance with an embodiment of the disclosure, assume more complex and irregular shapes.

FIG. 3A shows a 3D gating space 200 in which gate vectors for features in scene 30, such as gate vectors GV(f1), GV(132), GV(131), and GV(f2) discussed above may be defined in accordance with an embodiment of the disclosure. The space is optionally defined by orthogonal coordinate axes labeled $Q_{G1}$, $Q_{G2}$, and $Q_{G3}$ that extend from an origin 201 of the gating space and along which values for variables $Q_{G1}$, $Q_{G2}$, and $Q_{G3}$ may be indicated. Ends, hereinafter also referred to as gate state points or state points, of normalized gate vectors defined by normalized photocharges lie on a 3D gating space curve 199 in 3D gating space 200. As distance for a feature in scene 30 increases from a location at lower bound distance 91 (FIG. 1) of the maximum depth range DR-M of GT-TOF camera 20 when using gates G40, G50, and G60, to upper bound distance 92 (FIG. 1), a gate state point for the feature traverses gating space curve 199 from and back to origin 201 of 3D gating space 200 in a direction indicated by direction arrow 204. Normalized gate vectors GV(f1), GV(132), GV(131), and GV(f2) for features f1, 132, 131, and f2 discussed above with reference to FIGS. 2A-2D respectively are shown in gating space 200, and gate state points SP-GY(f1), SP-GV(132), SP-GV(131), and SP-GV(f2) respectively associated with the gate vectors are shown on gating space curve 199.

Gating space curve 199 is a piecewise linear curve because gates G40, G50, and G60, transmitted light pulses 41, 51, and 61, and light pulses reflected from the transmitted light pulses are assumed to have the idealized, rectangular forms by which they are schematically represented in FIGS. 2A-2D and resultant time correlation functions CF40, CF50, and CF60, are rectilinear, triangular functions. A realistic gating space curve determined for realistic gate and light pulse shapes would be a relatively continuous space curve rather than a piecewise linear curve.

By way of example, FIG. 3B schematically shows a gating space curve 202 determined for simulated realistic shapes for gates G40, G50, and G60, transmitted light pulses, 41, 51, and 61, and resultant time correlation functions CF40, CF50, and CF60. The figure shows normalized gate vectors GY(f1), GV(132), GV(131), and GV(f2) and corresponding gate state points SP-GY(f1), SP-GV(132), SP-GV(131) SP-GV(f2) on gating space curve 202 for features f1, 132, 131, and f2, determined for the realistic simulation. For ease of visual orientation, projections of 3D gating space curve 202 on planes $Q_{G1}$-$Q_{G2}$, $Q_{G2}$-$Q^{G3}$, and $Q^{G3}$-$Q_{G1}$, are indicated by dotted curves 203.

It is noted that whereas an end of a normalized gate vector for a given feature in scene 30 lies on gating space curve 202 (or gating space curve 199) a gate vector for the feature for which photocharges accumulated for the feature during gates G40, G50, and G60 are not normalized by a normalizing photocharge $Q_o$, will not have its end on the gating space curve. However, if a normalized gate vector for the feature and a non-normalized gate vector for the feature are free of adulteration by background light and measurement bias, as, by way of example, depicted in FIGS. 2A-2D, the non-normalized gate vector will, though not coextensive with, be coincident with the normalized gate vector.

In an embodiment of the disclosure, a projection of a gate vector GV( ) determined by GT-TOF camera 20 for a feature in scene 30 onto a two dimensional plane, hereinafter also referred to as a "range phasor plane", determines a range phasor and a range phase angle for the feature from which a distance to the feature may be determined. The range phasor is a projection of the gate vector GV( ) onto the range phasor plane optionally along a direction normal to the plane, and the corresponding range phase angle is an angle that the range phasor makes with an axis in the plane having a convenient direction. A projection onto the range phasor plane of a gating space curve from the gating space in which gate vectors GV( ) are defined provides a phasor trajectory for the range phasors.

For a gate vector GV( ) defined by GT-TOF camera 20 in an N-dimensional gating space, the range phasor plane is advantageously defined by a normal having direction cosines with respect to the N axes that span the gating space. In an embodiment, the direction cosines for the N axes are proportional to the inverses of the total exposure times of GT-TOF camera 20 for the gates respectively associated with the axes. For example, if GT-TOF camera 20 is gated on for an n-th gate of the N gates for each of M(n) light pulses transmitted by GT-TOF camera 20, then a total exposure time of the camera for the n-th gate is equal to $M(n)\tau_G(n)$, where $\tau_G(n)$ is the gate width of the n-th gate. A normal to the range phasor plane may have a direction cosine along the n-th axis that is substantially proportional to $1/M(n)\tau_G(n)$. If M(n) is the same for all n, for each axis the direction cosine of the normal may be inversely proportional to the gate width of the gate associated with the axis. For the choice of direction cosines inversely proportional to total exposure times of their associated gates, a direction of a range phasor, and thereby the range phase angle associated with the range phasor in the range phasor plane are substantially independent of background light that might contaminate light registered by pixels 23 in photosensor 22 (FIG. 1). For the choice of direction cosines inversely proportional to total exposure times, the range phase angle for a feature imaged on a pixel 23 is also substantially independent of reflectivity of the feature. Alternatively a range phasor space may advantageously be defined by a normal having the same direction cosines along each of the N axes. Photocharges accumulated during the N gates may be weighted by the inverse of the respective total exposure times of GT-TOF camera 20 to the range phasor plane. The weighted photocharges also generate a range phasor having range phase angle, and thereby distance determined from the range phase angle, substantially independent of background light and feature reflectivity.

For the 3D gating space 200 (FIG. 3B) described above, gates G40, G50, or G60 by way of example have equal gate widths. A range phasor plane may therefore advantageously be a plane coincident with a plane of a triangle defined by dot-dash lines 205 in FIG. 3B between points along axes $Q^{G1}$, $Q_{G2}$, and $Q_{G3}$ of gating space 200 that are equidistant from origin 201 of the gating space. A normal (not shown) to the plane defined by lines 205 has direction cosines that are equal. The plane defined by dot-dash lines 205 may also be referenced by the numeral 205.

FIG. 4 shows a projection of gating space 200 onto range phasor plane 205. In the projection, gating space coordinate axes $Q_{G1}$, $Q_{G2}$, and $Q_{G3}$, are projected to lines $Q^*_{G1}$, $Q^*_{G2}$, and $Q^*_{G3}$ that are rotated one from the other by 120°. The projection shows a phasor trajectory 202*, which is a projection of 3D gating space curve 202 onto range phasor plane 205. The projection also shows normalized range phasors GV*(f1), GV*(132), GV*(131), and GV*(f2) that are projections of normalized gate vectors GV(f1), GV(132), GV(131), and GV(f2) (FIG. 3) onto the range phasor plane. Projections SP-GV*(f1), SP-GV*(132), SP-GV*(131), and SP-GV*(f2) of gate state points SP-GV(f1), SP-GV(132), SP-GV(131), and SP-GV(f2) are shown in FIG. 4 on phasor trajectory 202*. Locations and features of projections onto range phasor plane 205 are optionally referenced to a coordinate system having orthogonal X and Y coordinate axes. Optionally, projection $Q^*_{G1}$ is coincident with the X axis in the plane. In an embodiment, an angle that a range phasor makes with the X axis is a range phase angle of the phasor. Range phase angles $\theta_P(132)$, $\theta_P(131)$, and $\theta_P(f2)$, associated with normalized range phasors GV*(132), GV*(131), and GV*(f2) respectively are labeled in FIG. 4. A range phase angle $\theta_P(f1)$ for normalized range phasor GV*(f1) is equal to zero and is not labeled in the figure. Symbol strings, GV, GV* and $\theta_P$, are respectively used to generically represent a gate vector, its associated range phasor, and the range phase angle of the phasor.

As distance of a feature in scene 30 from GT-TOF camera 20 increases from a location at lower bound distance 91 (FIG. 1) of the maximum depth range DR-M of the camera a range phasor GV*( ) for the feature, whether normalized or un-normalized by $Q_o$, rotates counter clockwise away from the X axis and its associated range phase angle $\theta_P(\ )$ increases. For example, feature 131 (FIG. 1) is farther from GT-TOF camera 20 than feature 132, and range phase angle $\theta_P(131)$ is greater than range phase angle $\theta_P(132)$. Similarly, range phase angle $\theta_P(f2)$ is greater than phase angle $\theta_P(132)$.

FIG. 4 indicates that for range phase angles $\theta_P$ in accordance with an embodiment of the disclosure that satisfy a constraint $0°<\theta_P<240°$, there is a substantially one to one mapping of feature distances to range phase angles and each different range phase angle may be associated with a different distance of a feature in scene 30 from GT-TOF camera 20. It is noted that a range phasor determined in accordance with an embodiment of the disclosure for a same given feature in scene 30 has a same range phase angle whether or not the range phasor is a normalized or un-normalized range phasor. Whereas a normalized and un-normalized range phase may have and generally will have different magnitudes they will, if error free, have a same range phase angle.

It is noted that the substantially one to one mapping appropriate for range phases $\theta_P$ for which $0°<\theta_P<240°$ assumes that amounts of photocharges $Q_{G1}$, $Q_{G2}$, and $Q_{G3}$ from which the range phase angles are determined are substantially uncontaminated by, or are corrected for, photocharge generated by sources other than light in light pulses reflected by features in scene 30 from light pulses that GT-TOF camera 20 transmits. For example, photocharges $Q_{G1}$, $Q_{G2}$, and $Q_{G3}$ may be corrected for contamination by background light by measuring and subtracting contributions of background light to the photocharges. "Subtraction" may be performed, as discussed above, by scaling photocharge accumulations inversely to gate widths or substantially automatically by choosing a normal to the range phasor plane having direction cosines inversely proportional to gate widths. Alternatively or additionally, background light or other sources of error such as dark current may be partially adjusted for by requiring that amounts of photocharges $Q_{G1}$, $Q_{G2}$, and $Q_{G3}$ used to determine range phase angles be greater than a predetermined threshold magnitude.

With respect to range phase angles $\theta_P$ equal to 0° or 240°, there is a many-to-one mapping of feature distance to range phase angle, and many different feature distances map to each range phase angle 0° and 240°. Range phase angles of 0° or 240° correspond to distances of features in scene 30 for which reflected light pulses that the features reflect from light pulses transmitted by GT-TOF camera 20 have trailing edges that reach the camera at times between time $t_1$ and $t_2$ (FIG. 2A) or have leading edges that reach the camera between times $t_2+\tau_p$ and $t_3+\tau_p$.

In an embodiment of the disclosure, GT-TOF camera 20 is calibrated to match range phase angles $\theta_P$ that the camera provides for features in a scene that the camera images to distances of the features. Calibration may by way of example be performed by imaging a suitable "calibration surface" at each of a plurality of different "calibration distances" from GT-TOF camera 20. For each calibration distance, photocharges $Q_{G1}$, $Q_{G2}$, and $Q_{G3}$ are acquired for each of a plurality of pixels 23 in photosensor 22, and a range phase angle determined from the photocharges. The range phase angles may be stored in association with their respective calibration distances for which they were determined in a lookup table (LUT) that is accessible by controller 24. Controller 24 may determine a distance to a feature in a scene that GT-TOF camera 20 images by determining a distance in the LUT associated with a range phase angle $\theta_P$ that controller 24 calculates from photocharges $Q_{G1}$, $Q_{G2}$, and $Q_{G3}$ that a pixel 23 that images the feature provides.

In an embodiment, data acquired responsive to calibrating GT-TOF camera 20 may be used to generate a function for each pixel 23 that relates range phase angle $\theta_P$ determined from photocharges $Q_{G1}$, $Q_{G2}$, and $Q_{G3}$ registered by the pixel to distance of a feature imaged on the pixel for which the photocharge was registered. Controller 24 may determine a distance to a feature in a scene that GT-TOF camera 20 images by calculating a value for the function using as an input value a range phase angle $\theta_P$ determined from photocharges $Q_{G1}$, $Q_{G2}$, and $Q_{G3}$ that a pixel 23 on which the feature is imaged provides. A function "$D(\theta_P)$" that relates range phase angle to feature distance for a pixel may be referred to as a distance-phase function.

By way of example, FIG. 5 shows a graph 300 of an actual distance-phase function $D(\theta_P)$ experimentally determined for a pixel comprised in a photosensor of a GT-TOF camera operating in accordance with an embodiment of the disclosure. A curve 303 in the graph shows a relationship of distance in mm (millimeters) to range phase angle in degrees for the distance phase function, which may also be referred to by the reference numeral 303. In an embodiment a distance-phase function $D(\theta_P)$, in accordance with an embodiment of the disclosure may be expressed as a Fourier series comprising a limited number of Fourier components.

In general it is expected that for a relatively large angular range of range phase angles, a distance-phase function $D(\theta_P)$ in accordance with an embodiment of the disclosure may be substantially linear. As a result the distance-phase function may advantageously be approximated by a series expansion comprising a constant, and a relatively small number of Fourier components. Curve 303, which as noted above represents an experimentally determined distance-phase function $D(\theta_P)$, is substantially linear in an angular range of range phase angles $\theta_P$ between about 65° to about 215° and corresponding feature distances from about 10 cm (centimeters) to about 1 m (meter). Distance-phase function 303 may readily be satisfactorily approximated by a series expansion having a small number of terms. For example, in a range from about 80° to about 220° corresponding to feature distances from about 20 cm to about 110 cm distance phase function 303 may be approximated by a series expansion comprising a term linear in $\theta_P$, and Fourier series comprising a first harmonic in $\theta_P$, to an accuracy of about 10 mm. If the Fourier series comprises two harmonic term in $\theta_P$ the series expansion approximates $D(\theta_P)$ 303 to within an error of about 3 mm.

It is noted that a series expansion of a distance-phase function $D(\theta_P)$ for a pixel of a GT-TOF camera in accordance with an embodiment of the disclosure occupies a relatively small volume of a memory and may require relatively moderate processor time to implement. A GT-TOF camera, in accordance with an embodiment of the disclosure, such as GT-TOF camera 20, which determines distances to features in a scene that it images using range phase angles may operate with relatively moderate demands on memory and processor time.

It is also noted that it is assumed in the above discussion that a different train of light pulses, of which light pulses 41, 51, and 61 are respectively single representative light pulses, is transmitted to illuminate a scene for each different gate for which a GT-TOF camera is gated ON. However, a photosensor may comprise CMOS smart pixels having a plurality of different storage regions for photocharge. The pixels may be controllable to accumulate photocharge generated by light incident on the pixels during different gates in different storage regions of the plurality of storage regions. A GT-TOF camera in accordance with an embodiment of the disclosure comprising such a photosensor may be controlled to accumulate photocharge for different gates, for example gates G40, G50, and G60, from reflected light pulses reflected from light pulses transmitted in a same, single train of light pulses.

Figure 6:
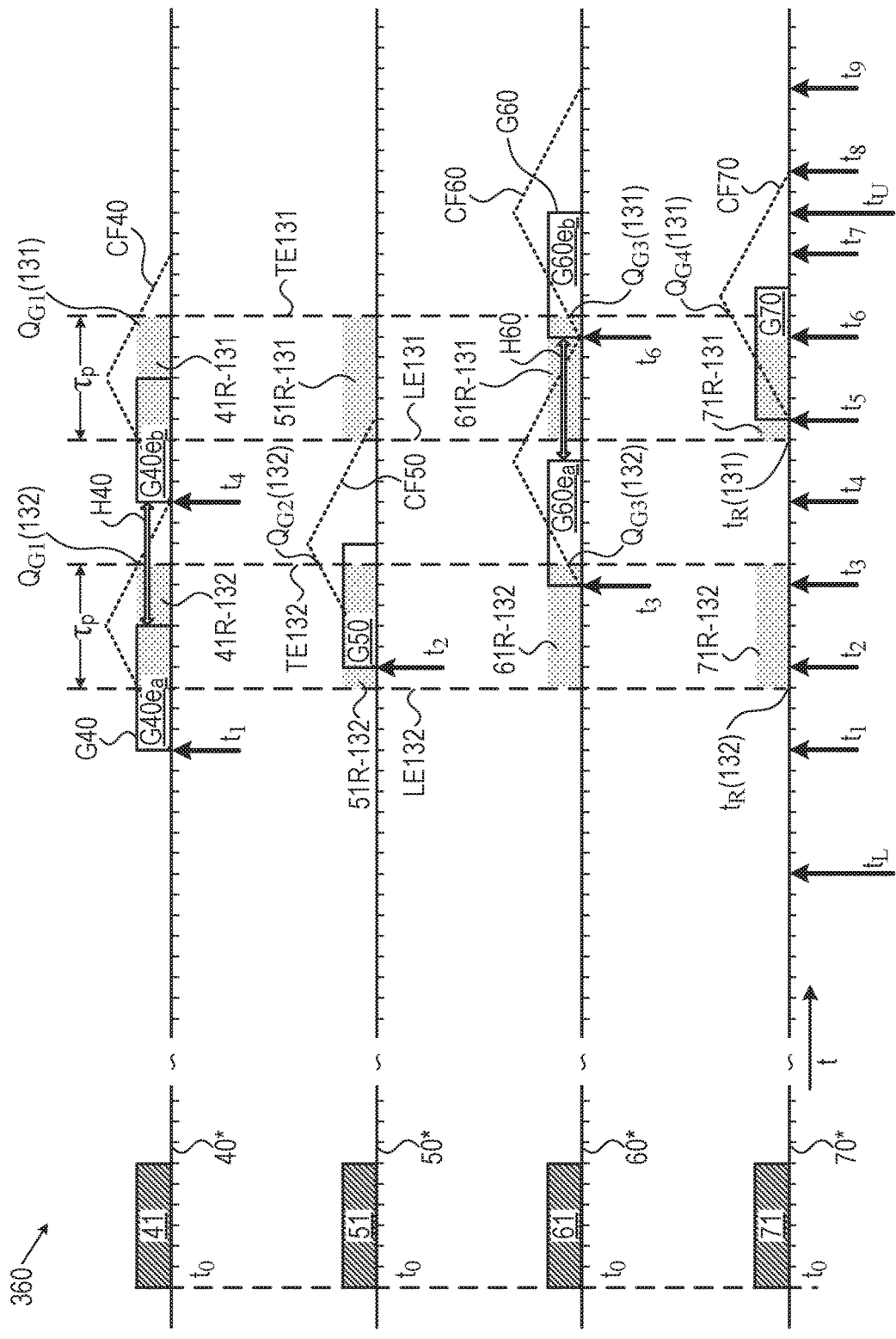
FIG. 6 shows a schematic time-line graph illustrating a gating configuration comprising four gates, two of which are multi-exposure gates comprising two exposure periods that may be used to provide a four dimensional gating space and range phase angles for determining distances to features in a scene in accordance with an embodiment of the disclosure.

In the above discussion, GT-TOF camera 20 is described using three gates, each gate comprising a single exposure period, to determine gate vectors, in accordance with an embodiment of the disclosure. However, practice of embodiments of the invention is not limited to using three gates, nor gates having only a single exposure period. A gating configuration in accordance with an embodiment of the disclosure may comprise a number of gates other than three, of which one or more may be a multi-exposure gate comprising two or more exposure periods. Optionally, each gate is associated with a different light pulse train that GT-TOF camera transmits to illuminate a scene that the camera images. For example, FIG. 6 shows a time-line graph illustrating a gating configuration 360 comprising four gates, two of which, also referred to as binary-exposure gates, are multi-exposure gates comprising two exposure periods. Gating configuration 360 provides GT-TOF camera 20 with an extended depth range and may be used to determine gate vectors, range phase angles, and therefrom distances to features in a scene that the camera images. The discussion of gating configuration 360 below assumes that GT-TOF implements the gating configuration to image features in scene 30 (FIG. 1).

As shown in FIG. 6 gating configuration 360 comprises four gates G40, G50, G60, and G70, of which, gates G40 and G60 are binary-exposure gates comprising two exposure periods, and gates G50 and G70 are single exposure period gates. The gates are shown along time-lines 40*, 50*, 60* and 70* respectively in FIG. 6. Binary-exposure gate G40 comprises exposure periods $G40e_a$ and $G40e_b$, and binary-exposure period G60 comprises exposure periods $G60e_a$ and $G60e_b$. Each gate G40, G50, G60, and G70 is optionally associated with a different one of optionally four light pulse trains referenced by numerals 40 (FIG. 1), 50, 60, and 70 (not shown) that light source 26 in GT-TOF camera 20 transmits to illuminate scene 30 (FIG. 1). Gates G40, G50, G60, and G70 are respectively associated with light pulse trains 40, 50, 60, and 70.

Time line 40* shows a transmitted light pulse 41 from light pulse train 40 and exposure periods $G40e_a$ and $G40e_b$ of binary-exposure gate G40 associated with light pulse train 40. Also shown along time-line 40* is a correlation function CF40 for binary-exposure gate G40 and reflected light pulses 41R-131, and 41R-132, that features 131 and 132 (FIG. 1) respectively reflect from transmitted light pulse 41 back to GT-TOF camera 20. Time line 50* shows a transmitted light pulse 51 from light pulse train 50 and single exposure period gate G50 associated with light pulse train 50, a correlation function CF50 for the exposure gate, and reflected light pulses 51R-131, and 51R-132 that features 131 and 132 (FIG. 1) respectively reflect from transmitted light pulse 51 back to GT-TOF camera 20. Time line 60* shows a transmitted light pulse 61 from light pulse train 60 and exposure periods $G60e_a$ and $G60e_b$ of binary-exposure gate G60 associated with light pulse train 60 and a correlation function CF60 for binary-exposure gate G60. Also shown along time-line 60* are reflected light pulses 61R-131, and 61R-132 that features 131 and 132 (FIG. 1) respectively reflect from transmitted light pulse 61 back to GT-TOF camera 20. Time line 70* shows a transmitted light pulse 71 from light pulse train 70 and single exposure period gate G70 associated with light pulse train 70, a correlation function CF70 of the exposure gate, and reflected light pulses 71R-131, and 71R-132 that features 131 and 132 (FIG. 1) respectively reflect from transmitted light pulse 71 back to GT-TOF camera 20.

In an embodiment, all transmitted light pulses 41, 51, 61, or 71 optionally have a same pulse width $\tau_p$, and all exposure periods of gates G40, G50, G60, or G70 may have a same duration equal to a gate width $T_G$. Exposure periods $G40e_a$ and $G40e_b$ of binary-exposure gate 40 are separated by a hiatus H40, and exposure periods $G60e_a$ and $G60e_b$ of binary exposure gate G60 are separated by a hiatus H60. Optionally hiatuses H50 and H60 have a substantially same duration, which are substantially equal to the gate width $\tau_G$. Transmitted light pulses 41, 51, 61, or 71 are transmitted at nominal times $t_o$. ON times of exposure periods of gates G40, G50, G60, or G70 are labeled $t_1$, $t_2$, $t_3$, $t_4$, $t_5$, and $t_6$ in order of increasing magnitude of their delay relative to transmission time $t_o$ of the transmitted light pulse with which they are associated and follow. In an embodiment consecutive ON times differ by $(\frac{2}{3})\tau_G$. Optionally, as schematically shown in FIG. 6, gate width $\tau_G$ is substantially equal to pulse width $\tau_p$.

Arrival times at GT-TOF camera 20 of leading and trailing edges of reflected light pulses 41R-132, 51R-132, 61R-132, 71R-132 are indicated by intersections of dashed lines LE131 and TE131 with respective time-lines 40*, 50*, 60*, and 70*, along which the reflected light pulses are shown. Reflected light pulse 41R-132 overlaps exposure period G40$e_a$, reflected light pulse 51R-132 overlaps gate G50, and reflected light pulse 61R-132, overlaps exposure period G60$e_a$. Reflected light pulse 71R-132 does not overlap gate G70. As a result, pixel 23-132 (FIG. 1) on which GT-TOF camera 20 images feature 132 registers reflected light and accumulates photocharge for feature 132 only during gates G40, G50, and G60. Amounts of photocharge that pixel 23-132 accumulates for feature 132 during gates G40, G50, G60, and G70, responsive to light that feature 132 reflects is schematically represented by intersections of trailing edge line TE132 with correlation functions CF40, CF50, CF60, and CF70.

Similarly to the discussion above of FIGS. 2A-2D and FIGS. 3A and 3B, let values for parameters $Q_{G1}$, $Q_{G2}$, $Q_{G3}$ and $Q_{G4}$, represent amounts of photocharge that a pixel 23 in photosensor 22 accumulates from a feature that the pixel images during gates G40, G50, G60, and G70. Parameters $Q_{G1}$, $Q_{G2}$, $Q_{G3}$ and $Q_{G4}$ span a four dimensional (4D) gating space. Values for $Q_{G1}$, $Q_{G2}$, $Q_{G3}$ and $Q_{G4}$ acquired for a feature in scene 30 that GT-TOF camera 20 images may define a 4D gate vector in the 4D gating space. A range phasor and range phase angle may be determined from the 4D gate vector and used to provide a distance of the feature from GT-TOF camera 20 in accordance with an embodiment of the disclosure. From FIG. 6, for feature 132: $Q_{G1}=Q_{G1}(132) \approx 0.5$; $Q_{G2}=Q_{G2}(132) \approx 0.84$; $Q_{G3}(132) \approx 0.16$; and $Q_{G4}=Q_{G4}(132) \approx 0.0$. Feature 132 may therefore have a 4D gate vector GV(132)=(0.5, 0.84, 0.16, 0), in accordance with an embodiment of the disclosure.

It is noted that an amount of photocharge accumulated by a pixel during a multi-exposure gate is a sum of photocharge accumulated by the pixel during each of the exposure periods of the multi-exposure gate. As a result, an amount of photocharge $Q_{G1}(132)$ accumulated by pixel 23-132 during binary-exposure gate G40 does not provide any information as to whether the photocharge was accumulated responsive to light incident on pixel 23-132 during exposure period G40$e_a$ or exposure period G40$e_b$ of the binary-exposure gate. Neither does the amount of photocharge $Q_{G3}(132)$ accumulated by pixel 23-132 during binary-exposure gate G60 provide any information as to whether the photocharge was accumulated responsive to light incident on pixel 23-132 during exposure period G60$e_a$ or exposure period G60$e_b$ of the binary-exposure gate. The information provided by photocharges $Q_{G1}(132)$ and $Q_{G3}(132)$ accumulated by pixel 132 during binary-exposure gates G40 and G60 is not sufficient to determine a distance to feature 132 without removing the ambiguity with respect to during which of the exposure periods of the binary-exposure gates the photocharges were accumulated.

For example, even though feature 131 is farther from GT-TOF camera 20 than feature 132, amounts of photocharge accumulated by GT-TOF camera 20 for feature 131 during binary-exposure gates G40 and G60 are the same as the amounts of photocharge accumulated for feature 131 during the binary-exposure gates. In FIG. 6 arrival times at GT-TOF camera 20 of leading and trailing edges of reflected light pulses 41R-131, 51R-131, 61R-131, 71R-131 are given by dashed lines LE131 and TE 131 respectively. From the overlap of the reflected light pulses with gates G40, G50, G60, and G70, and the intersections of TE131 with the correlation functions for the gates: $Q_{G1}=Q_{G1}(131) \approx 0.5$; $Q_{G2}=Q_{G2}(131) \approx 0.0$; $Q_{G3}(131) \approx 0.16$; and $Q_{G4}=Q_{G4}(131) \approx 0.84$. Feature 131 may therefore have a 4D gate vector GV(131)=(0.5, 0.0, 0.16, 0.84), in accordance with an embodiment of the disclosure. For features 131 and 132, $Q_{G1}(132)=Q_{G1}(131)$ and $Q_{G3}(132)=Q_{G3}(131)$ and their respective gate vectors GV(131) and GV(132) have the same components $Q_{G1}$ and the same components $Q_{G3}$.

Whereas the binary-exposure gates G40 and G60 in gating configuration 360 that provide components $Q_{G1}( )$ and $Q_{G3}( )$ for gate vectors GV( ) of features imaged by GT-TOF camera 20 generate an ambiguity, the single exposure gates G50 and G70 that provide components $Q_{G2}( )$ and $Q_{G4}( )$ for the gate vectors remove the ambiguity. For example for feature 132, $Q_{G2}(132)=0.84$ but $Q_{G2}(131)=0$; and $Q_{G4}(132)=0.0$ but for feature 131 $Q_{G2}(132)=0$ and $Q_{G4}(131)=0.84$. For gating configuration 360, if photocharge $Q_{G2}( )$ accumulated by a pixel during gate G50 has a non-zero value, photocharges $Q_{G1}( )$ and $Q_{G3}( )$ accumulated by the pixel 23 is accumulated during first exposure periods G40$e_a$ and G60$e_a$ of binary gates G40 and G60 respectively. Similarly, if photocharge $Q_{G4}( )$ accumulated by a pixel during gate G70 has a non-zero value, photocharges $Q_{G1}( )$ and $Q_{G3}( )$ accumulated by the pixel 23 is accumulated during second exposure periods G40$e_b$ and G60$e_b$ of binary gates G40 and G60 respectively. A gate vector GV( ) for a feature in scene 30 therefore can have a non zero component $Q_{G2}( )$ or $Q_{G4}( )$ only if component $Q_{G4}( )$ or $Q_{G2}( )$ respectively is equal to zero.

As a result, the single exposure gates G50 and G70 in gating configuration 360 divide the 4D gating space in which gate vectors GV( ) are defined into two non-overlapping contiguous first and second gating subspaces (not shown). In the first gating subspace component $Q_{G2}( )$ of gate vectors have non-zero values and component $Q_{G4}( )$ of the gate vectors is zero. In the second gating subspace component $Q_{G4}( )$ of the gate vectors have non-zero values and component $Q_{G2}( )$ of the gate vectors is zero.

In an embodiment of the disclosure, the first and second subspaces of the 4D gating space may be considered first and second 3D gating subspaces. In the first 3D gating subspace a gate vector GV( ) of a feature for which $Q_{G4}( )=0$, traces out a first 3D gating space curve (not shown) as a function of distance of the feature from GT-TOF camera 20 similar to gating space curve 202 (FIG. 3). Similarly, in the second 3D gating subspace a gate vector of a feature for which $Q_{G2}( )=0$, traces out a second 3D gating space curve (not shown) as a function of distance of the feature from GT-TOF camera 20 similar to gating space curve 202 (FIG. 3). In an embodiment, the second gating subspace is transformed by a parity transformation that maps values for $Q_{G4}$ to $Q_{G2}$. The transformation maps gate vectors GV( ) that lie in the second gating subspace into parity transformed gate vectors "$\overline{GV()}$" in the first 3D gating subspace. The transformation also maps the second gating space curve into the first 3D gating subspace as a mirror image of the first gating space curve.

Figure 7:
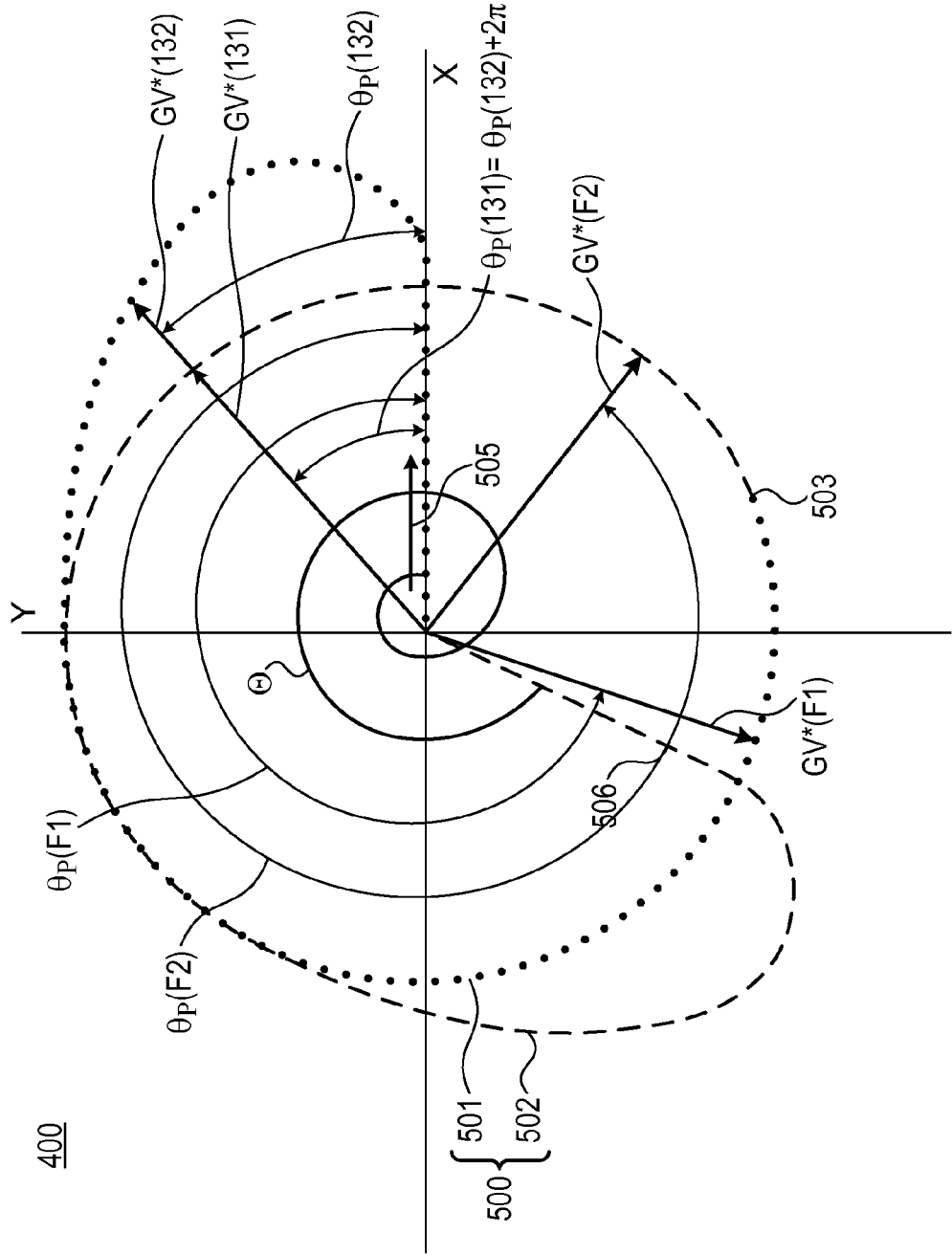
FIG. 7 shows a schematic 2D phase trajectory that a range phasor defined using the gating configuration shown in FIG. 6 traces out as distance from the GT-TOF camera of a feature associated with the gate vector changes, in accordance with an embodiment of the disclosure.

Optionally, the first gating subspace and the parity transformed second gating subspace are projected onto a same 2D range phasor plane 400 schematically shown in FIG. 7 so that gate vectors GV( ) and $\overline{GV()}$ are projected onto the range phasor plane to provide corresponding range phasors GV*( ) and $\overline{GV*()}$ and their respective associated range phasor angles $\theta_p$. The projection also projects the first gating space curve and the parity transformed second gating space curve into a compound phasor trajectory 500 comprising first and second phasor trajectory branches 501 and 502. The second branch 502 joins the first branch 501 at a branch junction 503. Locations of features in range phasor plane 500 are optionally referenced to X and Y axes that intersect at an origin of coordinates 402.

The ends of range phasors GV*( ) and $\overline{GV^*()}$ projected from corresponding gate vectors, assuming the corresponding gate vectors are normalized gate vectors, lie on compound phasor trajectory 500. As distance of a feature in scene 30 from GT-TOF camera 20 increases from a distance at which the feature is located at a lower bound distance 91 (FIG. 1) of the depth range DR-M of the camera, the end of the range phasor that the camera provides for the feature moves from the origin of X-Y coordinates in a direction indicated by an arrow 505 to traverse compound phase trajectory 500 in a counterclockwise direction. With counterclockwise displacement of the end of the range phasor along compound phasor trajectory 500, the range phase angle $\theta_p$ of the range phasor increases. Up to distance, hereinafter also referred to as a branching distance, of the feature from GT-TOF camera 20 at which the range phasor intersects compound phasor trajectory 500 at branch junction 503, the end of the range phasor lies on first branch 501 of the compound phase trajectory. For distances greater than the branching distance, the end of the phasor lies on the second branch 502 of compound phasor trajectory 500. By way of example, FIG. 7 schematically shows an exemplary range phasor GV*(F1) having its end located on first branch 501 of compound phase trajectory 500 for a feature F1 (not shown) located at a distance less than the branching distance. Exemplary range phasor GV*(F1) is associated with a range phase angle $\theta_p$(F1). The figure also shows an exemplary range phasor $\overline{GV^*(F2)}$ having its end located on second branch 502 of compound phase trajectory 500 for a feature F2 (not shown) located at a distance greater than the branching distance. Exemplary range phasor $\overline{GV^*(F2)}$ is associated with a range phase angle $\theta_p$(F2).

As the distance of the feature increases from the branching distance to a distance, hereinafter also referred to as a $2\pi$ distance, the end of the phasor moves along the second branch from branching junction 503 to the intersection, also referred to as a $2\pi$ intersection, of the second branch with the X-axis. As the distance of the feature increases beyond the $2\pi$ distance, the phasor angle is greater than $2\pi$ and increases to a maximum angle $\Theta$ greater than $2\pi$ for which the phasor lies along a portion 506 of compound phasor trajectory 500.

By way of example, FIG. 7 shows a range phasor GV*(132) for feature 132 (FIG. 1) and a range phasor $\overline{GV^*(131)}$ for feature 131. Because as noted above, $Q_{G1}(132)=Q_{G1}(131)$ and $Q_{G3}(132)=Q_{G3}(131)$ range phasor $\overline{GV^*(131)}$ has a direction coincident with the direction of range phasor GV*(132). However, feature 132 is located at a distance from GT-TOF camera 20 that is less than the branching distance corresponding to branch junction 503. Range phasor GV*(132) therefore lies on branch 501 of compound phasor trajectory 500 and has a range phase angle $\theta_p$(132) that is less than $2\pi$. On the other hand, range phasor $\overline{GV^*(131)}$ is located at a distance from GT-TOF camera 20 greater than the $2\pi$ distance. As a result, range phasor $\overline{GV^*(131)}$ lies on branch 502 of compound phasor trajectory 500 and has a range phasor angle $\theta_p(131)=\theta_p(132)+2\pi$.

As in the case of phasor trajectory 202*, phasor trajectory 500 provides a one to one mapping of distances of features in scene 30 in a depth range of GT-TOF camera 20 to range phase angles $\theta_p$ for distances for which $0<\theta_p<\Theta$. A depth range for GT-TOF camera 20 operating in accordance with gating configuration may be as much as 50% to 100% greater than a depth range provided by the gating arrangement shown in FIGS. 2A-2D.

In the above discussion, examples of gating configurations, gating spaces and 2D phasor trajectories in accordance with embodiments of the disclosure are described for specific gating configurations having three and four gates. As noted above however, practice of the invention is not limited to gating configurations having three or four gates. GT-TOF camera 20 may operate to determine distances to features in a scene using a gating configuration in accordance with an embodiment having N gates, G1, G2, G3, . . . GN, that give rise to an N-dimensional gating space spanned by N coordinate axes $Q_{G1}, Q_{G2}, Q_{G3}, \ldots Q_{GN}$. An N dimensional gate vector for a feature in the scene defined by photocharge accumulated responsive to light reflected from the feature during the N-gates may be projected onto a 2D range phasor plane to determine a range phasor having a range phase angle from which distance to the feature may be determined, in accordance with an embodiment of the disclosure.

In an embodiment, it may be advantageous for projections of the N coordinate axes $Q_{G1}, Q_{G2}, Q_{G3}, \ldots Q_{GN}$ onto the 2D range phasor plane to be angularly equally spaced about a projection of the origin of the N-dimensional space onto the range phasor plane. For example, let the projections of coordinate axes $Q_{G1}, Q_{G2}, Q_{G3}, \ldots Q_{GN}$ from the N-dimensional gating space onto the 2D range phasor plane be represented by projected axes $Q^*_{G1}, Q^*_{G2}, Q^*_{G3}, \ldots Q^*_{GN}$, similarly to the way in which for N=3, projections of axes $Q_{G1}, Q_{G2}, Q_{G3}$ are represented in FIG. 4 by projected axes $Q^*_{G1}, Q^*_{G2}, Q^*_{G3}$. Then, optionally, an angle between any two adjacent axes, $Q^*_{Gn}$ and $Q^*_{G(n+1)}$, is equal to $2\pi/N$. If $Q^*_{G1}$ is coincident with the X-axis in the 2D phasor plane then the n-th projected axis $Q^*_{Gn}$ makes an angle $\alpha(n)=(n-1)2\pi/N$ with the X-axis.

Let a feature "f" in the scene for which GT-TOF camera 20 provides an N-dimensional gate vector GV(f), have a range phasor $\overline{GV^*(f)}$ in the 2D range phasor plane defined by projected accumulated photocharges $Q^*_{G1}(f), Q^*_{G2}(f), Q^*_{G3}(f) \ldots Q^*_{GN}(f)$. Then range phasor $\overline{GV^*(f)}$ has a range phase angle $\theta_p(f)$, which may be used to provide distance to the feature, in accordance with an embodiment of the disclosure, given by an expression $\theta_p(f)=\arctan\,[(\tau_n \sin \alpha(n)Q^*_{Gn}(f)/(\Sigma_n \cos \alpha(n)Q^*Gn(f)]+\theta_o$ where $\theta_o$ is an offset angle. Offset angle $\theta_o$ may be related to a variety of factors, such as the shape of the light pulse, an earliest gate ON time "$t_{ON}(1)$" of a first gate (G(1)) relative to a time $t_o$ of the light pulse, light pulse width $\tau_p$, and a gate width $\tau_G$. In an embodiment, the value of the offset angle is determined responsive to a calibration process to provide a best correspondence between calculated and true distances.

Assume that all the gates G1, G2, G3, . . . GN have exposure periods $T_G$ having a substantially same duration that is optionally substantially equal to the pulse widths $\tau_p$ of light pulses that GT-TOF camera 20 transmits to illuminate the scene that it images. Then, gates G1, G2, G3, . . . GN may have ON times relative to a time at which a light pulse is transmitted by GT-TOF camera 20 that correspond to angles $\alpha(n)$. An earliest ON time $t_{ON}(1)$ is chosen for a first gate to be compatible with a desired lower bound detection distance as shown in FIGS. 2A-2D and $t_{ON}(1)$ may define an angle $\alpha(1)$ optionally equal to 0. If an ON time of the n-th gate Gn is represented by $t_{ON}(n)$, then $t_{ON}(n)$ may be expressed, $t_{ON}(n)=t_{ON}(1)+(2\tau_G)\alpha(n)/2\pi=t_{ON}(1)+(2\tau_G)(n-1)/N$. The time duration $2\tau_G$ in the expression for $t_{ON}(n)$ may be understood to be a gate period for gates G1, G2, G3, . . . GN. A gate Gn having an ON time $t_{ON}(n)$ following a transmission time at which GT-TOF camera 20 transmits a light pulse may then be understood as having a phase displacement relative to the first gate ON time equal to $2\pi(n-1)/N$. In an embodiment, computation of the distance to the feature comprises multiplying $\theta_p(f)$ by a multiplicative term equal to the speed of light, c, times $\tau_G$ divided by $2\pi$. For GT-TOF camera 20 operating with N gates and a delay between ON times equal to $(\tfrac{2}{3})\tau_G$ in accordance with an embodiment of the disclosure, distance D(f) to feature f may be expressed:

$$D(f)=N((c/2)(\tfrac{2}{3})\tau_G)(\theta_P(f)/2\pi), \text{ where } 0\le\theta_P(f)\le2\pi.$$

There is therefore provided in accordance with an embodiment of the disclosure, a gated time of flight (GT-TOF) camera operable to determine distances to features in a scene, the GT-TOF camera comprising: a light source configured to transmit at least one light pulse train to illuminate the scene; a photosensor comprising a plurality of pixels configured to register amounts of light reflected from transmitted light pulses in the at least one light pulse train by features in the scene that are imaged on the pixels; and a controller configured to: gate ON and gate OFF the photosensor responsive to times at which the light source transmits light pulses in the at least one pulse train to enable the pixels to register light reflected by features in the scene during each of N different gates; and determine a distance to a feature in the scene imaged on a pixel of the plurality of pixels responsive to a direction in an N-dimensional space of an N-dimensional vector defined by the amounts of light registered by the pixels during the N gates.

Optionally determining the distance to the feature comprises determining a direction of a phasor defined in a two dimensional space responsive to the direction of the N-dimensional vector. Optionally, determining the direction of the phasor comprises determining a phase angle of the phasor in the two dimensional space. The phasor is optionally a vector that lies along a projection of the N-dimensional vector onto a plane of the two dimensional space.

The N-dimensional space may be defined by N coordinate axes along which the amounts of light registered by the pixel during the N gates are respectively measured. Optionally, each of the N axes makes a same angle with the plane that contains the phasor.

In an embodiment, the controller is configured to calculate a distance to the feature in accordance with a function that determines a distance responsive to a phase angle. The function optionally comprises a term that is linear in the phase angle. The function may comprise a first harmonic term of a Fourier series that is a function of the phase angle.

In an embodiment, the controller comprises a memory having a lookup table (LUT) that associates phase angles of phasors with distances of features from the camera, and is configured to use the LUT to determine a distance to the feature.

In an embodiment, the controller comprises a memory having a lookup table (LUT) that associates directions of the N-dimensional vector with distances of features from the camera, and is configured to use the LUT to determine a distance to the feature.

In an embodiment, N is equal to three. In an embodiment, N is greater than three.

There is further provided in accordance with an embodiment of the disclosure a method of determining distances to features in a scene, the method comprising: transmitting at least one light pulse train to illuminate the scene; determining amounts of light reflected from the transmitted light pulses by features in the scene for each of N different exposure periods; determining a distance to a feature in the scene responsive to a direction in an N-dimensional space of an N-dimensional vector defined by the amounts of reflected light determined for the feature for the N exposure periods.

Determining the distance to the feature may comprise determining a direction of a phasor defined in a two dimensional space responsive to the direction of the N-dimensional vector. Optionally, determining the direction of the phasor comprises determining a phase angle of the phasor in the two dimensional space.

In an embodiment, the phasor is a vector that lies along a projection of the N-dimensional vector onto a plane of the two dimensional space. In an embodiment of the method the N-dimensional space is defined by N coordinate axes along which the amounts of light determined for each of the exposure periods are respectively measured. Optionally, each of the N axes makes a same angle with the plane that contains the phasor.

In an embodiment the method comprises calculating the distance to the feature in accordance with a function that determines a distance responsive to a phase angle.

In an embodiment the method comprises using a lookup table (LUT) that associates phase angles of phasors with distances to features in the scene to determine the distance to the feature. In an embodiment the method comprises using a LUT that that associates directions of the N-dimensional vector with distances to features in the scene to determine the distance to the feature.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments. Some embodiments utilize only some of the features or possible combinations of the features. Variations of embodiments of the disclosure that are described, and embodiments comprising different combinations of features noted in the described embodiments, will occur to persons of the art. The scope of the invention is limited only by the claims.

The invention claimed is:

1. A gated time of flight (GT-TOF) camera operable to determine distances to features in a scene, the GT-TOF camera comprising:
 a light source configured to transmit at least one light pulse train to illuminate the scene;
 a photosensor comprising at least one of pixel configured to register amounts of light reflected from transmitted light pulses in the at least one light pulse train by a feature in the scene that is imaged on the at least one pixel; and
 a controller configured to:
  gate ON and gate OFF the photosensor responsive to times at which the light source transmits light pulses in the at least one pulse train to enable the pixels to register light reflected by features in the scene during each of N different gates;
  determine a phase angle of a phasor in a two dimensional space based on amounts of light registered by the at least one pixel during each of the N gates; and
  determine a distance to the feature based on the phase angle.

2. The GT-TOF camera according to claim 1 wherein the phasor is a vector that is a projection onto a plane of the two dimensional space of an N-dimensional vector defined in an N-dimensional space by the amounts of light registered by the at least one pixel during the N gates.

3. The GT-TOF camera according to claim 2 wherein the N-dimensional space is defined by N coordinate axes along which the amounts of light registered by the at least one pixel during the N gates are respectively measured.

4. The GT-TOF camera according to claim 3 wherein an angle between any two adjacent projections of the axes onto the plane is equal to $2\pi/N$.

5. The GT-TOF camera according to claim 4 wherein if an n-th component of the N dimensional vector for a feature "f" in the scene is a quantity $Q_{Gn}(f)$ along an n-th axis of the N coordinate axes that represents an amount of light registered by the at least one pixel during the n-th gate, and the projection of the component on the plane is represented by $Q^*_{Gn}(f)$, then a phase angle $\theta_p(f)$ of the phasor for the feature may be given by an expression $\theta_p(f) = \arctan[(\Sigma_n \sin((n-1)2\pi/N)Q^*_{Gn}(f))/(\Sigma_n \cos((n-1)2\pi/N)Q^*_{Gn}(f))] + \theta_o$.

6. The GT-TOF camera according to claim 5 wherein the controller is configured to:
   map the N dimensional vector for the feature f to an (N-M) dimensional vector defined in an (N-M) subspace of the N dimensional space, for which features in the scene do not reflect light from the transmitted light pulses that is registered by the at least one pixel for M of the N gates; and
   use the (N-M) dimensional vector to define a phase angle $\theta_p(f)$ of the phasor for the feature.

7. The gated GT-TOF camera according to claim 3 wherein each of the N axes makes a same angle with the plane that contains the phasor.

8. The gated GT-TOF camera according to claim 2 wherein N is greater than or equal to three.

9. The gated GT-TOF camera according to claim 1 wherein at least one of the N gates is a multi-exposure gate comprising two or more exposure periods.

10. The gated GT-TOF camera according to claim 1 wherein the controller is configured to calculate a distance to the feature in accordance with a function that determines a distance responsive to a phase angle.

11. The gated GT-TOF camera according to claim 10 wherein the function comprises a term that is linear in the phase angle.

12. The gated GT-TOF camera according to claim 11 wherein the function comprises a first harmonic term of a Fourier series that is a function of the phase angle.

13. The gated GT-TOF camera according to claim 1 wherein the controller comprises a memory having a lookup table (LUT) that associates phase angles of phasors with distances of features from the camera, and is configured to use the LUT to determine a distance to the feature.

14. A method of determining distances to features in a scene, the method comprising:
   transmitting at least one light pulse train to illuminate the scene;
   determining amounts of light reflected from the transmitted light pulses in the at least one light pulse train by features in the scene for each of N different gates of a camera;
   determining for a feature in the scene a phase angle of a phasor that is a projection onto a plane of a two dimensional space of an N-dimensional vector defined in an N-dimensional space by the amounts of reflected light determined for the feature for each of the N different gates; and
   determining a distance to the feature in the scene based on the phase angle.

15. The method according to claim 14 wherein the N-dimensional space is defined by N coordinate axes along which the amounts of light determined for each of the gates are respectively measured.

16. The method according to claim 15 wherein each of the N axes makes a same angle with the plane that contains the phasor.

17. The method according to claim 14 wherein determining the distance comprises calculating the distance to the feature in accordance with a function that determines a distance responsive to a phase angle.

18. The method according to claim 14 and comprising using a lookup table (LUT) that associates phase angles of phasors with distances to features in the scene to determine the distance to the feature.

19. A method of determining distances to features in a scene, the method comprising:
   transmitting at least one light pulse train to illuminate the scene;
   determining amounts of light reflected from the transmitted light pulses by features in the scene for each of N different gates of a camera;
   associating with each of the N gates a different given direction in a two dimensional space spanned by an X and Y axis, wherein an angular difference between any two of the different directions is equal to an integer multiple of $2\pi/N$;
   representing the determined amounts of light reflected from the transmitted light pulses by features in the scene for each of the N different gates as vectors having directions the same as that of the given directions with which the gates are respectively associated and magnitudes proportional to the amounts of light;
   for a feature in the scene determining a direction of a phasor in the two dimensional space that is a direction of the vector sum of the vectors representing the determined amounts of reflected light from the feature; and
   determining a distance to the feature based on the direction of the phasor.

20. The method according to claim 19 wherein the magnitudes of the vectors have a same constant of proportionality relative to the amounts of light that the vectors represent.

* * * * *